United States Patent
Presta et al.

(10) Patent No.: US 9,836,517 B2
(45) Date of Patent: Dec. 5, 2017

(54) SYSTEMS AND METHODS FOR MAPPING AND ROUTING BASED ON CLUSTERING

(71) Applicant: Facebook, Inc., Menlo Park, CA (US)

(72) Inventors: Alessandro Presta, San Francisco, CA (US); Arun Sharma, Union City, CA (US)

(73) Assignee: Facebook, Inc., Menlo Park, CA (US)

( * ) Notice: Subject to any disclaimer, the term of this patent is extended or adjusted under 35 U.S.C. 154(b) by 226 days.

(21) Appl. No.: 14/047,830

(22) Filed: Oct. 7, 2013

(65) Prior Publication Data

US 2015/0100574 A1  Apr. 9, 2015

(51) Int. Cl.
*G06F 17/30* (2006.01)

(52) U.S. Cl.
CPC .............................. *G06F 17/30584* (2013.01)

(58) Field of Classification Search
None
See application file for complete search history.

(56) References Cited

U.S. PATENT DOCUMENTS

| | | | |
|---|---|---|---|
| 7,143,091 B2* | 11/2006 | Charnock | G06F 17/30716 |
| 8,510,380 B2 | 8/2013 | Faller et al. | |
| 9,025,624 B2* | 5/2015 | Lee | G03F 7/70025 |
| | | | 372/21 |
| 9,286,391 B1* | 3/2016 | Dykstra | G06F 17/30864 |
| 9,317,610 B2* | 4/2016 | Vaynblat | G06F 3/0481 |
| 2009/0030932 A1* | 1/2009 | Harik | G06Q 10/10 |
| 2009/0082997 A1* | 3/2009 | Tokman | G06K 9/6224 |
| | | | 702/179 |
| 2009/0132561 A1* | 5/2009 | Cormode | G06F 17/30958 |
| 2009/0248434 A1* | 10/2009 | Pfeffer | G06Q 20/3224 |
| | | | 705/346 |
| 2010/0161369 A1 | 6/2010 | Farrell et al. | |
| 2012/0310747 A1 | 12/2012 | Calabria | |
| 2013/0117688 A1 | 5/2013 | Yerli et al. | |
| 2014/0279626 A1 | 9/2014 | Joo et al. | |

FOREIGN PATENT DOCUMENTS

WO  2013062237  5/2013

OTHER PUBLICATIONS

Newman et al., Finding and evaluating community structure in networks Feb 04, Physical Review E, vol. 69 Iss 2, 15 pages.*
Newman et al., Assortative Mixing in Networks Oct. 28, 2002, Physical Review E, vol. 89 Iss. 20, 4 pages.*

(Continued)

*Primary Examiner* — Jason Liao
(74) *Attorney, Agent, or Firm* — Sheppard Mullin Richter & Hampton LLP

(57) ABSTRACT

Classifications associated with a plurality of nodes may be identified. The classifications may be grouped into first level communities based on edge weights between the classifications. The first level communities may be grouped into second level communities based on edge weights between the first level communities. A sorted list of the plurality of nodes may be generated based on the classifications, the first level communities, and the second level communities. Unique identifiers (IDs) may be assigned sequentially to the sorted list of the plurality of nodes.

17 Claims, 11 Drawing Sheets

(56) References Cited

OTHER PUBLICATIONS sgibb et al., Label and color leaf dendogram in r Sep. 14, 2013, stack overflow, http://stackoverflow.com/questions/18802519/label-and-color-leaf-dendrogram-in-r.*
Bollen, Happiness is assortative in online social networks Mar. 7, 2011, arXiv:1103.0784, 17 pages.*
Clauset, Network Analysis and Modeling Lecture 5, Sep. 10, 2013, sandafe.edu, 9 pages.*
Duda et al., Pattern Classifiction 2001, Wiley & Sons, $2^{nd}$ ed, pp. 550-552.*
Bollen et al., Happiness is assortative in online social networks Mar. 7, 2011, arXiv, https://arxiv.org/pdf/1103.0784.pdf.*
Hill et al., Building an Effective Representation for Dynamic Networks Feb. 19, 2005, semanticscholar.org, https://pdfs.semanticscholar.org/5086/bb43b204d602aa1a9e013bfd13812b9df2d8.pdf.*
International Application No. PCT/US2014/016582, International Search Report and Written Opinion dated Jun. 30, 2014.
Ugander, Johan et al., "Balanced Label Propagation for Partitioning Massive Graphs," Proceedings of the Sixth ACM International Conference on Web Search and Data Mining (WSDM '13), pp. 507-516, Feb. 4, 2013.
European Patent Application No. 14184966, Search Report dated Feb. 12, 2015.
European Patent Application No. 14184966, Examination Report dated Mar. 17, 2017.

* cited by examiner

SYSTEMS AND METHODS FOR MAPPING AND ROUTING BASED ON CLUSTERING

FIELD OF THE INVENTION

The present invention relates to the field of clustering. More particularly, the present invention provides techniques for assigning identification to users based on clustering.

BACKGROUND

Social networking websites provide a dynamic environment in which members can connect to and communicate with other members. These websites may commonly provide online mechanisms allowing members to interact within their preexisting social networks, as well as create new social networks. Members may include any individual or entity, such as an organization or business. Among other attributes, social networking websites allow members to effectively and efficiently communicate relevant information to their social networks.

A member of a social network may highlight or share information, news stories, relationship activities, music, video, and any other content of interest to areas of the website dedicated to the member or otherwise made available for such content. Other members of the social network may access the shared content by browsing member profiles or performing dedicated searches. Upon access to and consideration of the content, the other members may react by taking one or more responsive actions, such as providing feedback or an opinion about the content. The ability of members to interact in this manner fosters communications among them and helps to realize the goals of social networking websites.

Even routine usage of social networks may involve creation of large volumes of data over a vast array of computing resources. The ability to manage such volumes of data in a manner consistent with member expectations is important to optimal operation of social networks. For example, in their interactions with others, members who request resources of the social network desire timely presentation of information. As another example, members who may perform searches on the data maintained by the social network expect a timely return of search results.

SUMMARY

To cluster nodes and map the nodes to computing resources for optimal system performance, computer implemented methods, systems, and computer readable media, in an embodiment, may identify classifications associated with a plurality of nodes. The classifications may be grouped into first level communities based on edge weights between the classifications. The first level communities may be grouped into second level communities based on edge weights between the first level communities. A sorted list of the plurality of nodes may be generated based on the classifications, the first level communities, and the second level communities. Unique identifiers (IDs) may be assigned sequentially to the sorted list of the plurality of nodes.

In an embodiment, the plurality of nodes is associated with users of a social networking system.

In an embodiment, the plurality of nodes is associated with at least one of persons, non-persons, organizations, content, events, web pages, communications, objects, or concepts.

In an embodiment, the classifications may represent at least one attribute associated with the plurality of nodes.

In an embodiment, the attribute includes geographic locations.

In an embodiment, connections between nodes of the plurality of nodes are associated with the edge weights.

In an embodiment, the edge weights are based on numbers of the connections.

In an embodiment, the edge weights are based on strengths of the connections.

In an embodiment, the connections represent shared characteristics between nodes of the plurality of nodes.

In an embodiment, the edge weights account for the shared characteristics.

In an embodiment, a first shared characteristic is weighted differently from a second shared characteristic.

In an embodiment, the generation of the sorted list of the plurality of nodes comprises sorting the plurality of nodes by the second level communities.

In an embodiment, the generation of the sorted list of the plurality of nodes comprises sorting the plurality of nodes by the first level communities.

In an embodiment, the generation of the sorted list of the plurality of nodes comprises sorting the plurality of nodes by the classifications.

In an embodiment, nodes having shared characteristics are assigned unique IDs that are more numerically proximate than unique IDs assigned to nodes not having shared characteristics.

In an embodiment, communities at lower levels to communities may be iteratively grouped at higher levels based on edge weights between the communities at each of the lower levels. A sorted list of the plurality of nodes may be generated further based on the communities at higher levels.

In an embodiment, preexisting IDs associated with the plurality of nodes may be mapped to the unique IDs.

In an embodiment, the grouping of the classifications into first level communities comprises maximizing at least one of a number of connections or a strength of connections within a community, and minimizing at least one of a number of connections or a strength of connections between communities.

Many other features and embodiments of the invention will be apparent from the accompanying drawings and from the following detailed description.

Figure 1:
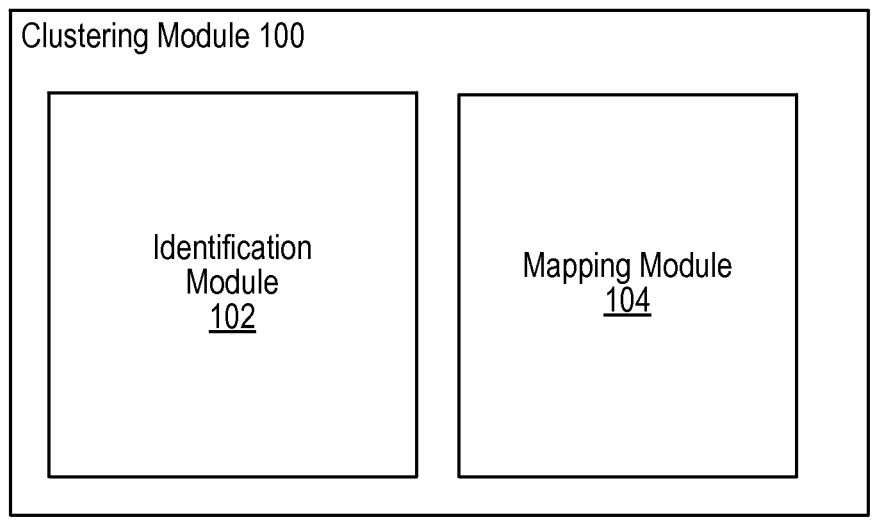
FIG. 1 illustrates an example clustering module, according to an embodiment of the present disclosure.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Node graphs, such as social graphs, may include an extremely large number of nodes and connections (or edges) between the nodes. The number of nodes, for example, may be in the hundreds of millions or even billions. In many cases, such as with social networking systems implemented by a networked computer system, users are able to access and share vast amounts of information with other users. The storing and providing of such vast amounts of data present many challenges. These challenges may include, for example, the significant computational and memory requirements that are involved in determining how to partition the node graph over a distributed system. For example, performing a query (or request) over the distributed system may potentially require a query to a large number of machines. This "fanout" of queries may not only slow down the query response time, but also may place excessive strain on the network.

The partitioning of the node graph information across the distributed system can have a great impact on the computational speed of and strain on a network. For example, where user information is stored (e.g., which machine) and how the user information is accessed or stored (e.g., in persistent memory or fast memory) may significantly impact the amount and speed of computations. Embodiments of the systems and methods described herein relate to generation of unique IDs which may be used to partition a node graph across a distributed system in an optimal manner. For example, the unique IDs may be generated in a manner that clusters nodes based on their relationships, and increases the tendency of these clusters to be local to the same machine.

Computational and network performance may be affected by the amount of traffic that the machines receive. Usage patterns may vary the amounts of load put on machines. Embodiments of the systems and methods described herein also relate to managing and balancing such load across machines. This may include, for example, determining usage patterns related to clusters and their corresponding effects on loads of machines, and then reallocating clusters to machines in a manner to better balance load.

FIG. 1 illustrates an example clustering module 100, according to an embodiment. The clustering module 100 includes identification module 102 and mapping module 104. The clustering module 100 may be implemented as part of a distributed system of networked computers, such as part of a social networking system. The components shown in this figure and all figures herein are exemplary only, and other implementations may include additional, fewer, or different components. Some components may not be shown so as not to obscure relevant details.

The identification module 102 may generate unique identifiers (IDs) to be assigned to nodes of a node graph. In an embodiment, the nodes may be associated with users of a social networking system. In an embodiment, the nodes may be associated with, for example, persons, non-persons, organizations, content (e.g., images, video, audio, etc.), events, web pages, communications, objects, concepts, or any other thing, notion, or construct, whether concrete or abstract, that can be represented as a node. The unique IDs may be generated by first determining a classification for each node. In an embodiment, the determination of a classification may be based on any attribute (or attributes). For example, the attribute may relate to geographic location (e.g., city of residence). In an embodiment, the determination of a classification is not based on edge weights between nodes, as described in more detail herein.

The classifications, in turn, may be grouped into a higher level communities based on edge weights defined between classifications. In certain embodiments, the edge weights may be based on a number of connections between classifications, the strengths of connections between the classifications, or a combination of these or other factors. Resulting communities may be iteratively grouped again into still higher level communities. These groupings into still higher level communities also may be based on edge weights between communities. The nodes may then be sorted by classifications and all levels of communities, and subsequently assigned unique IDs in a numerically sequential manner, as discussed in more detail herein.

In an embodiment, connections may represent any types of activities, interactions, common interests, or other shared characteristics between classifications and communities. The edge weights may account for shared characteristics differently. For example, a first type of shared characteristic may reflect a stronger relationship between two classifications or communities than a second type of shared characteristic. Therefore, based on their relative importance, the first type of shared characteristic may be weighted more heavily than the second type of shared characteristic. Accordingly, edge weights may reflect the relative importance of various types of shared characteristics. The value associated with shared characteristics can be represented by coefficients, as discussed in more detail herein.

The mapping module 104 may utilize the set of unique IDs for all nodes (also referred to as the "unique ID space") to partition the node graph over a networked computer system. In an embodiment, the unique ID space may be used to map nodes onto database servers of a networked computer system. In another embodiment, the unique ID space may be used to map nodes onto cache systems of a networked computer system.

The mapping module 104 may divide (or segment) the unique ID space by the number of partitions and route nodes to machines of the networked computer system based on the divisions. In an embodiment, these divisions may be equally weighted in certain instances to have the same number of unique IDs per division. In another embodiment, the divisions may not be equally weighted. The mapping module 104 may map nodes to machines based on their associated unique IDs, which results in a tendency of closely connected nodes (e.g., users and their friends) to be clustered on the same machine (or closely associated group of machines, such as a machine pool for instance). In an embodiment, the mapping module 104 takes into account load balancing considerations to map nodes to optimize the load on machines.

Figure 2:
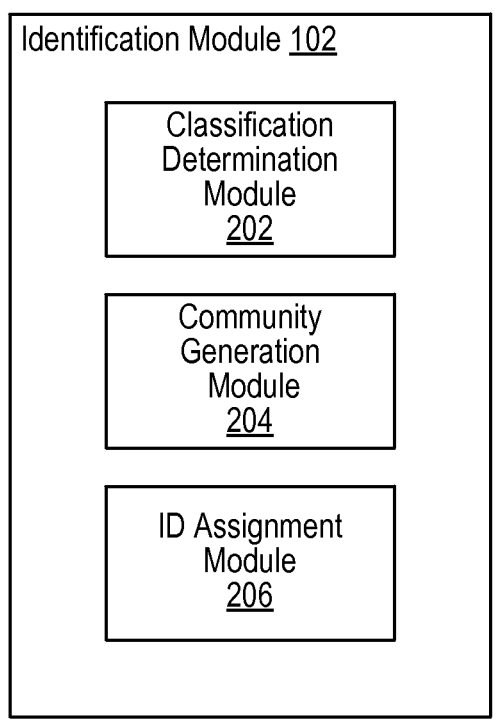
FIG. 2 illustrates an example identification module, according to an embodiment of the present disclosure.

FIG. 2 illustrates an example identification module 102, according to an embodiment. The identification module 102 may define a new graph of classifications (e.g., geographic location) instead of the original nodes. The identification module 102 may include classification determination module 202, community generation module 204, and ID assignment module 206. The classification determination module 202 may identify an attribute related to the nodes of a node graph, and may determine a classification for each node based on the attribute. An attribute may be any feature or concept according to which the nodes may be grouped. In an embodiment, more than one attribute and different combinations of attributes may be selected and used to classify nodes.

In an embodiment, an attribute may be a geographic association, such as an associated city, neighborhood, county, or other geographic location. Each node may be classified by its geographic association. For example, a social graph may include users as nodes and friendships as connections (or edges) between the nodes. An attribute of the users may be an associated city (e.g., city of residence). In such case, each user may be classified based on the city that is associated with the user. The users classified based on a city or other association may constitute a community of users.

Attributes that correlate strongly with connections between nodes may facilitate determination of communities. For instance, in the example of a social graph, geographic association may correlate strongly with friendships since people often tend to live, work, and socialize within a geographic area (e.g., city) and thus have a tendency to be friends with others in the same geographic area. Accordingly, the friends in a common geographic area may form a community, as described in more detail herein. As another example, any one or a number of demographic considerations (e.g., age, ethnicity, gender, religion, etc.) may be attributes that often correlate strongly with connections between nodes. In this regard, persons having similar demographic profiles are often friends. Accordingly, demographic considerations may be used to classify persons in the determination of communities. The classification of users in the determination of communities may be based on attributes other than those expressly described herein as examples.

The example regarding a social graph is used to provide exemplary context and to illustrate operative principles of various embodiments. Discussion of this example of a social graph should not be viewed as limiting. The underlying principles and concepts of this example regarding the social graph may be applicable to other types of graphs, nodes, connections, attributes, etc. in other embodiments.

The classification determination module 202 may represent the classifications (e.g., cities) as nodes of a new graph, and define edge weights (or values) between classifications. In certain embodiments, the edge weights may be based on a number of connections between classifications, the strength or type of connection between classifications, or a combination of these or other factors. In an embodiment, edge weights may be determined based on the total number of connections between classifications. For example, the edge weight may be proportional to the number of connections between any two classifications, such that that the more connections between two classifications, the larger the edge weight that represents their connections. For instance, the edge weight may be represented by the number of connections between the two classifications—e.g., 100 connections resulting in an edge weight of 100, 200 connections resulting in an edge weight of 200, etc. Other techniques to assign values to edge weights between classifications may be used in other embodiments.

In an embodiment, the edge weights may be determined based on strengths or quality of the connections (or affinity) between classifications. For example, individual connections between two classifications may have varying coefficients that are assigned based on strengths of the connections. For example, connections with trait "A" (e.g., two users are married) may be viewed as stronger (or more important) connections than connections with trait "B" (e.g., two users are colleagues). Accordingly, connections with trait "A" may be assigned a larger coefficient than connections with trait "B". For example, in the example of a social graph, a user in San Jose may have a certain number of friendships with ordinary acquaintances in San Francisco, but have an equal number of friendships with family members, close friends, or friends with whom the user is in frequent communication, in Los Angeles. The friendships in Los Angeles with family members, close friends, or friends with whom the user is in frequent communication may be assigned larger coefficient values than the friendships in San Francisco to reflect the stronger friendships in Los Angeles.

In general, the social graph data may include information about coefficients as measures of relatedness between nodes in the social graph. Coefficients may reflect weights for connections (or paths) between nodes in the social graph. For example, coefficients may indicate that a user is closer to her best friend than to another person befriended by the user based on the respective weights of the paths that connect them. Coefficients may be based on a variety of possible interactions between nodes, whether internal or external to the social networking system. Nodes may include users, people, pages, or any object in the social graph. The determination of coefficients may be directional, and depend on many factors, such as the relationship, interaction, or closeness between nodes in the social graph. As an example, the measure of relatedness of one user (e.g., User A) to another user (e.g., User B) may be based on various considerations including but not limited to whether: User A is friends with User B; User A commented on a photo of User B; User A liked content or a status update of User B; User A posted on the wall of User B; User A was on the same thread as User B; User A appears in the same photo as User B; a certain amount of time (e.g., days) transpires with (or without) User A engaging with User B or content of User B; User A linked to a comment of User B; User A shared content of User B with others; User A mentioned User B in a wall comment; User A viewed profile or other web page of User B; etc.

In the foregoing example concerning the determination of User A's coefficient for User B, many of the possible interactions informing the coefficient are based on actions of User A. However, other interactions involving actions of User B may also be considered in the determination of User A's coefficient for User B. Such interactions may include any variety of activities, such as whether: User B viewed a photo of User A; User B viewed an album of User A; a certain amount of time (e.g., days) transpires with (or without) User B engaging with User A or content of User A, etc. Further, the interactions that inform the determination of coefficients may be based on the time duration over which the interactions occurred (e.g., the last 30 days, 60 days, 90 days, or any other suitable time interval). Coefficients may also be based on a frequency of interaction within those historical time durations as well as other factors.

Coefficients may also be asymmetric in some instances. For example, for certain reasons (e.g., privacy), coefficient scores may be based solely on the acting user's actions. In an embodiment, a two-way coefficient score may be computed such that cache sharding better reflects usage patterns.

The community generation module 204 may group the classifications within communities at a first level based on the edge weights between classifications. In an embodiment, a community detection algorithm may be performed with the classifications as inputs, resulting in classifications (e.g., cities) being mapped to corresponding communities. For example, in an embodiment, classifications having edge weights with relatively large values between them may be grouped together in a community so as to maximize the number of connections or the strength of connections within a community and to minimize the number of connections or the strength of connections between communities.

Communities resulting from grouping classifications at the first level may be referred to as first level communities. Iterative groupings may be performed to generate communities at higher levels. For example, a community detection algorithm may be performed with first level communities as inputs to group first level communities to a higher level of second level communities. Similarly, a community detection algorithm may be performed with the second level communities as inputs to group second level communities to a higher level of third level communities, and so on. This technique results in classifications being grouped to first level communities, the first level communities being grouped to second level communities, the second level communities being grouped to third level communities, and the third level communities being grouped to yet still other higher level of communities. A community in each successive level of communities may be determined by maximizing the number of connections or the strength of connections within the community and by minimizing the number of connections or the strength of connections with other communities.

The iterative groupings to generate successive levels of communities are not limited in number. In an embodiment, the technique may involve mapping to n community levels, where n may be any integer value selected for optimal grouping of the classifications and communities. For example, the value of n may be two, three, or other suitable number. As another example, the value of n may be a value other than two or three.

In the example of a social graph, cities may be grouped into communities based on the edge weights between the cities (e.g., number of friendships between cities, the strength of the friendships between cities, both, etc.). The resulting first level communities may be further grouped into second level communities in a similar manner. The resulting second level communities may be further grouped into third level communities in a similar manner, and so on. Any number of iterative groupings of into higher level communities may be performed. In certain embodiments, preexisting IDs (e.g., user IDs) associated with the original nodes may be mapped to classifications and the various levels of communities.

Classifying nodes by attribute and then using the classifications as a working set by which to group the nodes into communities may provide significant advantages. In the example of a social graph, a working set based on nodes associated with over one billion users can be reduced to a working set based on classifications of 750,000 cities associated with the users. Such reduction in the working set may significantly reduce computation times for determining the unique IDs from, for example, many hours to a few minutes. Furthermore, the reduced working set may significantly decrease the number of iterative groupings needed for various applications. In some instances, the number of iterative groupings based on the reduced working set to achieve optimal clustering of nodes may be five iterations or less.

In the example of a social graph, the social graph may include approximately one billion nodes, which may be classified with respect to approximately 750,000 cities. When the cities are grouped based on the edge weights (e.g., number of connections) between the cities, the number of resulting first level communities may be approximately 2,000. If the first level communities are further grouped based on the edge weights between them, the number of resulting second level communities may be approximately 60. Subsequent attempts to group communities at even higher levels may not provide significant reductions in the number of communities.

While resulting communities at various levels may have some degree of correspondence with geographic area, they may be based on friendships, which may have a strong correlation to geography. The correspondence between communities and geographic area need not be a strict correspondence. For example, some geographic areas that are close to one another may not have many or strong friendships between them, and some geographic areas that are distant from one another may have many or strong friendships. The correlation between geographic area and friendships may be based on a wide range of considerations, such as cultural factors, demographic trends, common interests or ties, etc.

The ID assignment module 206 may assign unique IDs to a sorted list of nodes in a numerically sequential manner. The nodes may be sorted in a manner such that friends tend to be clustered together, and tend to have the same classifications and fall within the same communities. The ID assignment module 206 may sort the nodes by classifications and resulting communities. In an embodiment, the nodes may be sorted by classification, and then by first level community, and then again by second level community, and so on.

The unique IDs may be a numerical sequence (e.g., from one to 1 billion) that is assigned to the sorted list of nodes. In general, clustered nodes or communities at various levels will have unique IDs that are numerically proximate to one another. For example, nodes with the same classification will have unique IDs that are numerically proximate to each other. As another example, nodes within the same first level community will have unique IDs that are numerically proximate to each other. Nodes within the same second level community will have unique IDs that are numerically proximate to each other. Nodes within the same third level community will have unique IDs that are numerically proximate to each other. It should be appreciated that the term "numerically proximate" is used broadly herein and is not limited to unique IDs having a strict sequence of successive numbers including every integer or value from the beginning to the end of a sequence. For example, numerically proximate unique IDs may be numerically sequential odd numbers—e.g., 1, 3, 5, 7, 9, and so on. As another example, numerically proximate numbers may be a series of non-successive odd and even numbers—e.g., 1, 2, 4, 5, 7, 8, and so on. As yet another example, numerically proximate numbers may indicate that the difference between values in a set of unique IDs for the nodes, as determined by the techniques described herein, is relatively smaller than the difference between values in a set of another type of pre-existing IDs for the nodes.

The unique ID space may thus be structured such that friends, classifications, and communities have unique IDs that are proximate to one another. The unique IDs may be divided for mapping across a networked computer system. When the unique ID space is divided, the divisions of the unique ID space will include clusters of friends, as well as clusters of cities and communities at various levels. In some embodiments, a city or other community at a particular level may be split between partitions. In general, partitioning may improve locality and optimize system performance while reducing disadvantages associated with fan out, as discussed in more detail herein.

The identification module 102 may update definitions of the new graph. The definition of a new graph based on classifications instead of the original nodes by the identification module 102 may require fewer updates. In the example of a social graph, the number of friendships or strength of friendships between cities may be fairly static and may not change significantly over short periods of time. In contrast, changes to users may occur more frequently since people may, within a city, move, make new friends, etc. Thus, because the new graph is based on classifications instead of the original nodes, the identification module 102 may be required to perform relatively fewer updates to account for changes in the underlying data associated with users. In various embodiments, the identification module 102 may update the new graph at various intervals (e.g., every week, month, 3 months, 6 months, or other applicable time period) or upon the occurrence of certain events (e.g., a threshold change in the edge weights between cities or communities).

FIGS. 3A-3D illustrate an example mapping table, according to an embodiment. The example mapping table is described with respect to a social graph. However, underlying concepts discussed in connection with the table are not limited to any single social graph or its particular features.

Figure 3A:
FIGS. 3A-3D illustrate example mapping tables, according to an embodiment of the present disclosure.

In FIG. 3A, the table 300 includes a column USER that lists 12 users (e.g., nodes). For the sake of clarity and brevity, only 12 users are shown for exemplary purposes. It should be appreciated that the mapping table generated may include millions, billions, or any number of users. In an embodiment, the column USER may represent a preexisting ID (e.g., user ID) previously assigned for each user, which may then be accordingly mapped to the classifications (e.g., cities) in column L1 and communities in columns C1 and C2.

Column L1 represents the associated cities of the users. The cities may represent the residences of the users. For example, each of the users 1-12 is shown next to its associated cities—e.g., either New York (NY), San Francisco (SF), San Diego (SD), Los Angeles (LA), or New Jersey (NJ).

Column C1 represents $1^{st}$ (first) level communities that result from grouping the cities based on edge weights defined between the cities (e.g., based on the number of friendships between cities, strengths of the friendships between cities, etc.). In an embodiment, the $1^{st}$ level communities are selected such that cities having a large number (or strength) of friendships between them are grouped together so as to maximize the number (or strength) of friendships within $1^{st}$ level communities and to minimize the number (or strength) of friendships between $1^{st}$ level communities. As shown, NY is listed as within $1^{st}$ level community "1"; SF is listed as within $1^{st}$ level community "2"; SD and LA are listed as within $1^{st}$ level community "3"; and NJ is listed as within $1^{st}$ level community "4". In the embodiment shown, LA and SD may have a relatively large number of friendships between them, resulting in LA and SD being grouped within the same $1^{st}$ level community.

Column C2 represents $2^{nd}$ level communities that result from grouping the $1^{st}$ level communities based on edge weights defined between the $1^{st}$ level communities (e.g., based on the number of friendships between $1^{st}$ level communities, strengths of the friendships between $1^{st}$ level communities, etc.). In an embodiment, the $2^{nd}$ level communities are selected such that $1^{st}$ level communities having a large number (or strength) of friendships between them are grouped together so as to maximize the number (or strength) of friendships within $2^{nd}$ level communities and to minimize the number (or strength) of friendships between $2^{nd}$ level communities. In the embodiment shown, NY and NJ fall within the same $2^{nd}$ level community "1"; and SF, SD, and LA fall within the same $2^{nd}$ level community "2".

The cities and resulting levels of communities may then be sorted, resulting in a sorted list of users (or user IDs) based on cities and resulting levels of communities. For example, the users within the mapping table 300 may be sorted by cities (column L1), $1^{st}$ level communities (column C1), and $2^{nd}$ level communities (column C2). Since communities were grouped based on edge weights associated with friendships, friends are, or have a tendency to be, clustered together.

Figure 3B:

FIG. 3B shows the mapping table 300 after the users have been sorted by cities (column L1). As shown, users for LA are listed first at the top of the chart, followed by cities NJ, NY, SD, and then SF.

Figure 3C:

FIG. 3C shows the mapping table 300 after the users have been sorted by $1^{st}$ level community (column C1). As shown, users in $1^{st}$ level community "1" are listed first at the top of the chart 200, followed by users in $1^{st}$ level communities "2", "3", and then "4".

Figure 3D:

FIG. 3D shows the mapping table 300 after the users have been sorted based on $2^{nd}$ level communities (column C2). As shown, users in $2^{nd}$ level community "1" are listed first at the top of the chart 200, followed by users in $2^{nd}$ level community "2".

As a result of the sorting procedure, the users 1-12 are sorted by city, $1^{st}$ level communities, and $2^{nd}$ level communities. For example, all users within the $2^{nd}$ level community "2" are numerically proximate to each other (e.g., users 2, 6, 8, 11, 4, 7, 1, 3, and 12). Furthermore, within the $2^{nd}$ level community "2", all users within the $1^{st}$ level community "2" are numerically proximate to each other (e.g., users 2, 6, 8, and 11), and all users within the $1^{st}$ level community "3" are proximate to each other (e.g., users 4, 7, 1, 3, and 12). Still further, within $1^{st}$ level community "2", all users within the city "SF" are proximate to each other (e.g., users 2, 6, 8, and 11). Within $1^{st}$ level community "3", all users within the city "LA" are proximate to each other (e.g., users 4 and 7), all users within the city "NY" are proximate to each other (e.g., user 1), and all users within the city "SD" are proximate to each other (e.g., users 3 and 12). This same pattern also applies to all users within $2^{nd}$ level community "1".

In this way, when the identification module 102 assigns unique IDs in a numerically sequential manner to the sorted list of users, users within the same city and resulting levels of communities will have unique IDs that are numerically proximate one another. For example, the table 300 in FIG. 3D includes a column UQ_ID that lists a unique ID that has been assigned in a numerically sequential manner to users that have been sorted by classifications, $1^{st}$ level communities, and $2^{nd}$ level communities. As shown, users having the same classification or falling within the same community are proximate to one another, and accordingly have unique IDs that are numerically proximate to one another. Uniquely identifying nodes in this manner may prove beneficial or advantageous from the perspective of improving system performance and optimizing computing resources, as described herein. It should be appreciated that while communities may have a geographical component in some instances, in other instances communities may not have a geographical component. In FIG. 3A-3D, for example, user 1 and user 5 are both associated with NY but are within different $1^{st}$ level communities. User 1 may, for instance, have a large number of friends in $1^{st}$ level community "3" and is then grouped within $1^{st}$ level community "3". On the other hand, user 5 may have a large number of friends in $1^{st}$ level community "1" and is then grouped within $1^{st}$ level community "1".

In some embodiments, sorting techniques may differ. For example, instead of sorting on classifications and every level of communities, the users may be selectively sorted based on any combination of the classification or levels of communities. For example, the users may be sorted based on only the highest level community (e.g., the $2^{nd}$ level community). Then, unique IDs may be assigned based on such sorting. As another example, only the two highest level communities (e.g., the $1^{st}$ level community and the $2^{nd}$ level community) may be sorted before unique IDs are assigned.

Figure 4:
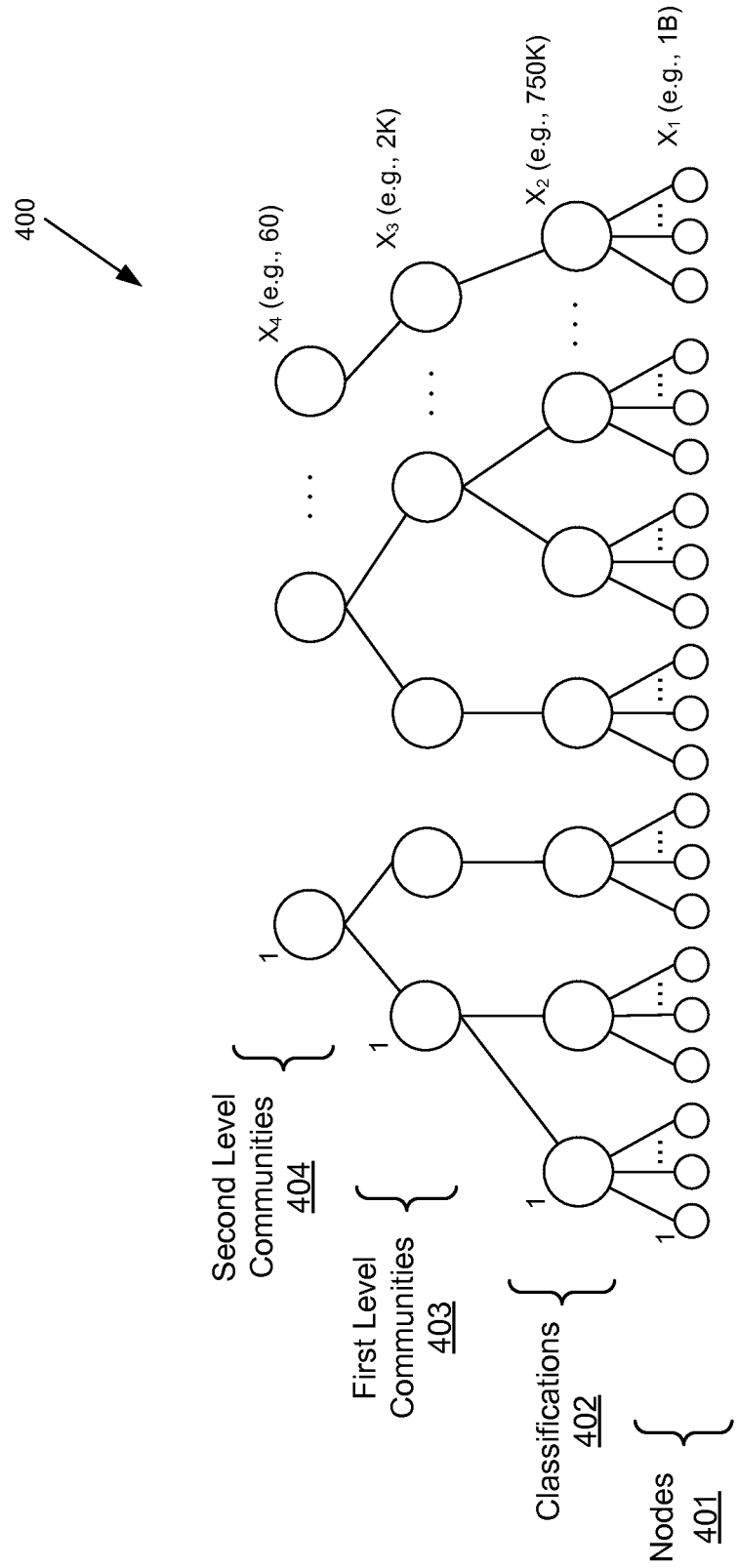
FIG. 4 illustrates an example tree diagram of nodes structured by classifications, $1^{st}$ level communities, and $2^{nd}$ level communities, according to an embodiment of the present disclosure.

FIG. 4 illustrates an example tree diagram 400 of nodes 401 assigned to classifications 402, $1^{st}$ level communities 403, and $2^{nd}$ level communities 404, according to an embodiment. The tree diagram 400 may include any suitable number, $x_1$, of nodes. In the example shown, one billion nodes 401 are grouped by the classifications 402, as represented by the lines from each node 401 to a corresponding classification 402. Any suitable number, $x_2$, of classifications associated with the nodes may be determined. In the example shown, 750,000 classifications 402 representing geographic locations (e.g., cities) are associated with the nodes 401. Each of the classifications 402 is grouped within $1^{st}$ level communities 403, as represented by the lines from each classification to a corresponding $1^{st}$ level community. Any suitable number, $x_3$, of $1^{st}$ level communities 403 may be determined. In the example shown, 2,000 $1^{st}$ level communities 403 are associated with the classifications 402. Furthermore, each of the $1^{st}$ level communities 403 are grouped within $2^{nd}$ level communities 404, as represented by the lines from each $1^{st}$ level community to a corresponding 2nd level community. Any suitable number, $x_4$, of $2^{nd}$ level communities may be determined. In the example shown, 60 $2^{nd}$ level communities 404 are associated with the $1^{st}$ level communities 403. The tree diagram 400 is structured such that nodes 401 having the same classification and falling within the same communities are clustered together, and are thus structured in a sorted manner based on the classifications 402, the $1^{st}$ level communities 403, and the $2^{nd}$ level communities 404. In this way, unique IDs may be assigned to nodes 401 in a numerically sequential manner from beginning to end (e.g., from left to right). Nodes having the same classification or falling within the same community will have unique IDs that are numerically proximate to one another. It should be appreciated that the values shown for $x_1$, $x_2$, $x_3$, and $x_4$ in FIG. 4 are exemplary. Any suitable number may be implemented in different embodiments.

Figure 5:
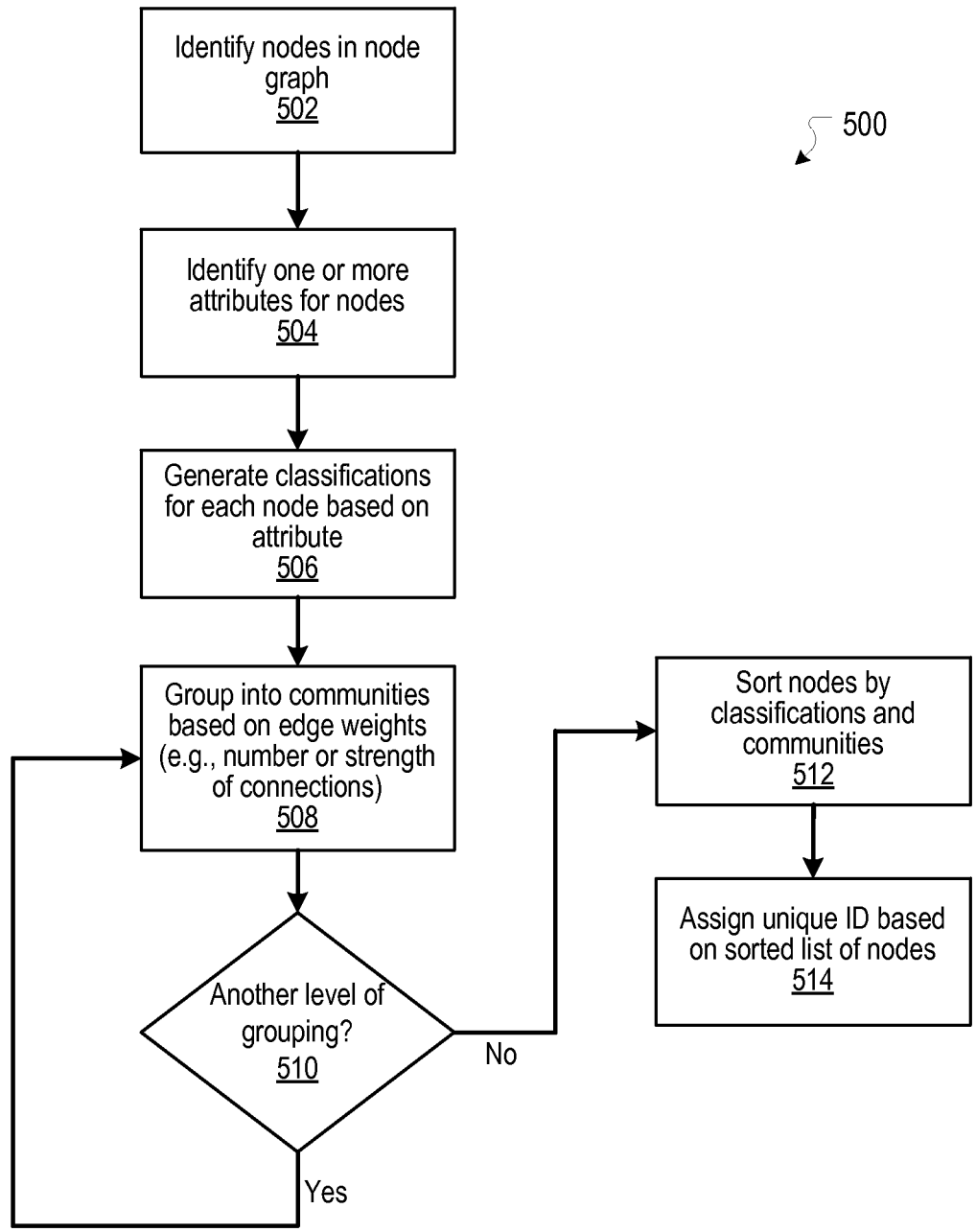
FIG. 5 illustrates an example process of assigning unique IDs to nodes of a node graph, according to an embodiment of the present disclosure.

FIG. 5 illustrates an example process of assigning unique IDs to nodes of a node graph, according to an embodiment. It should be appreciated that the discussion above for FIGS. 1-4 may also apply to the process for FIG. 5. For the sake of brevity and clarity, every feature and function applicable to FIG. 5 is not repeated here.

At block 502, nodes in a node graph may be identified. In an embodiment, for example, the nodes may be associated with users within a social graph. At block 504, one or more attributes for the nodes may be identified. The attributes may relate to the nodes, or connection between nodes. At block 506, classifications for each node may be generated based on the attribute. In one embodiment, the attribute may be a geographic association (e.g., association with a city), and the nodes may be classified by the geographic location they are associated with (e.g., city of residence, city of business or operation, etc.). The classifications may be viewed as nodes of a new graph, having edge weights defined between classifications. In an embodiment, the edge weights may be based on the number of connections between nodes. In an embodiment, the edge weights may be based on strengths of the connections, which may be represented by coefficients. In an embodiment, blocks 502, 504, and 506 may be performed by the classification determination module 202 of FIG. 2.

At block 508, the classifications (e.g., associated cities) may be grouped into communities based on the edge weights defined between the classifications (e.g., based on the number or strength of connections between classifications). The grouping may provide a map from classifications to $1^{st}$ level communities. At block 510, it is determined if an additional grouping into another level of communities is to be performed. If an additional grouping is to be performed, the $1^{st}$ level communities that resulted from block 508 are grouped based on the edge weights between the $1^{st}$ level communities (e.g., based on the number of connections between $1^{st}$ level communities or the strength of the connections between $1^{st}$ level communities), as represented by the arrow from block 510 to block 508. This process may be repeated in a similar manner for any additional groupings into higher level communities. If no additional groupings into higher level communities are to be performed, then, at block 512, the nodes (from block 502) are sorted based on a sorting of the classifications and resulting levels of communities. The nodes are sorted in a manner such that friends tend to be clustered together in the sorted list, and further tend to have the same classifications and fall within the same communities.

At block 514, unique IDs are assigned to the sorted list of nodes in a numerically sequential manner. In this way, nodes (e.g., users) having connections (e.g., friendships) will tend to be clustered together with the same classification and within the same communities, and accordingly have unique IDs that are numerically proximate to one another. In an embodiment, blocks 508 and 510 may be performed by the community generation module 204 of FIG. 2. Furthermore, in an embodiment, blocks 512 and 514 may be performed by the ID assignment module 206 of FIG. 2.

The classification and higher levels of communities may not necessarily provide finer grain information within classifications. For example, a sorted list of users may not necessarily be sorted such that sub-communities of friends within a city are sequentially proximate to one another in the unique ID space. A sub-community of a city may, for instance, be associated with a suburb having a high number of connections between users.

In an embodiment, sub-communities of nodes may be identified within a classification. For example, a classification for a sub-community may be derived in a similar manner as discussed herein. Nodes may then be grouped into sub-communities within the classification based on, for example, the number or strength of connections between nodes. Additional levels of sub-communities may also be iteratively computed. A sorted list of nodes may then be generated by sorting the nodes by classifications and sub-communities (and higher level communities). The unique IDs may then be assigned in a numerically sequential manner to the sorted list of nodes. In this way, sub-communities of nodes having connections will tend to be clustered together.

Uniquely identifying nodes based on the techniques performed by identification module 102 may provide advantages in various situations. For example, generating and assigning unique IDs by identification module 102 may improve the manner in which information may be compressed for storage. Networked computer systems may include main memory that may be slow to access but have large storage capacities. For this reason, compression may not be an important consideration with respect to main memory management. However, memory hierarchies of networked computer systems also often implement faster memory that may be accessed more often to enhance performance speed. Because the faster memory technologies tend to be more expensive, the size of the memory is often limited and thus compression techniques play a more important role to maximize the amount of data that can be stored therein. Delta encoding is one compression technique that may benefit from the unique ID space generated and assigned by the identification module 102.

For example, a user's friend list may include preexisting user IDs: 200; 3,000; and 30,000. Generally, to delta encode the friend list, the friends' user IDs are sorted from smallest to largest value. A preceding user ID value may be subtracted from each user ID, except the smallest user ID, which does not have a preceding user ID. The delta encoded list may include the following: 200; 2800; and 27,000. The value 2800 was derived by subtracting 200 from 3000, and the value 27,000 was derived by subtracting 3,000 from 30,000. By delta encoding, the idea is to generate smaller numbers which require less bits to store. However, as shown, when dealing with a large set of potential user ID values, the differences between user ID values may be relatively large values.

Because the unique IDs are assigned in a numerically sequential manner to a sorted list of nodes (e.g., users) that cluster the nodes based on connections, many nodes (e.g., users) that have connections (e.g., friendships) will be clustered together within the sorted list, and ultimately assigned unique IDs that are sequentially proximate to one another. Therefore, the same friends with user IDs 200; 3,000; and 30,000 may have unique IDs assigned by identification module 102 that sequentially proximate to one another, such as: 1,001; 1,003; and 1010. Applying delta encoding to these unique IDs results in the delta encoding values: 1,001; 2; and 7. These delta encoded values provide significantly smaller values, which require significantly less data to store in memory.

Generating and assigning unique IDs to nodes based on the techniques performed by the identification module 102 may prove beneficial when partitioning a massive graph at scale across networked computer systems, including disks, machines, database servers, and data centers.

Figure 6:
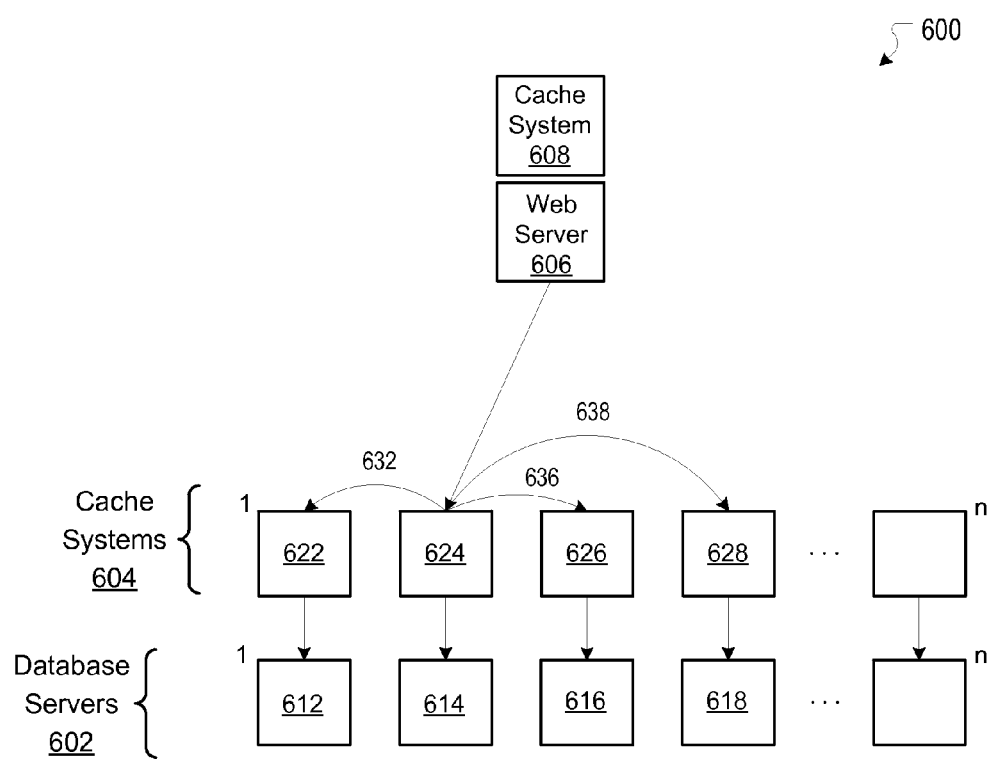
FIG. 6 illustrates an example networked computer system, according to an embodiment of the present disclosure.

FIG. 6 illustrates an example networked computer system 600, according to an embodiment. The networked computer system 600 includes n database servers 602, n cache systems 604 associated with the database servers 602, web server 606, and cache system 608 associated with web server 606, where n is any number of database servers and associated cache systems to support the computer networked system 600, such as a social networking system. The database servers 602 include database server 612, database server 614, database server 616, and database server 618. The cache systems 604 include cache system 622, cache system 624, cache system 626, and cache system 628. The database server 612 is associated with the cache system 622; the database server 614 is associated with the cache system 624; the database server 616 is associated with the cache system 626; and the database server 618 is associated with the cache system 628. The database servers 602, the cache systems 604, and the web server 606 may be communicatively coupled to one another through one or more networks, such as a LAN, WAN, and the internet. Each of the database servers 602 may represent a single database server or a data center. Information for the graph, such as a social graph, may be stored within a persistent memory layer formed by the database servers 602.

In the example of a social graph, the database servers 602 may include user information for all of the users in the social graph. The user information may include, for example, information related to a user profile, images, videos, posts, status updates, friends lists, feeds, or any other information associated with the user and the activities of the user on a social networking system supported by the social graph. User information for a specific user may be stored on a specific database server of the database servers 602. Users may be mapped to one of the database servers 602 irrespective of any of the user's friendships. For instance, new users of a social networking system may be allocated to one of the database servers 602 based on which of the database servers 602 has capacity to maintain data about the user at the time the user joined the social networking system.

In certain embodiments, a user ID associated with a user may be used to indicate which of the database servers 602 a user's information is to be stored on. If user information is desired for a given user, then the specific database server with the user's information may be queried to obtain the user's information. For example, when user A accesses the web server 606 of the networked computer system 600, the web server 606 may identify the user ID for user A, and may use the user ID to determine that the user information for user A is stored on the database server 614. The user information for user A may include, for example, a friend list of user A's friends or other information about user A.

User information for each of user A's friends may then be obtained by querying each database server having user information for a respective friend, as represented by queries 632, 636, and 638 to the respective database servers 612, 616, and 618. The queries 632, 636, and 638 to each of the respective database servers 612, 616, and 618 represent fanout queries. While the example shows three additional queries 632, 636, and 638 to respective database servers 612, 616, and 618, user A may have a significantly larger number of friends (e.g., hundreds or thousands of friends) spread out over many of the database servers 602, which could potentially require a fanout query to a different database server for each friend. In this circumstance, the large number of fanout queries would be undesirable. Fanout queries may significantly decrease performance (e.g., speed with which information is obtained) and generate excessive amounts of network traffic, especially when dealing with extremely large number of nodes and queries. The problems associated with fanout queries are further compounded when queries for user information for "friends of friends" of (or for indirect friends having still larger degrees of separation from) user A are performed. Fanout queries may also contribute to excessive use of memory in the cache systems 604.

The networked computer system 600 also includes the cache systems 604 implemented in association with the database servers 602 to provide faster memory access than the persistent memory layer of database servers 602. For example, the cache systems 604 may implement cache layer services within RAM or other form of fast memory technology, such as Flash memory. For instance, data or computations may be cached using Alternative PHP Cache (APC), Memcache, etc. Similarly, web server 606 may also cache data or computations within cache system 608. When a query for user information for user A is first sent to a given database server 614, for example, the user information may be retrieved from the database server 614 and also stored in the cache system 624. Thereafter, as long as the user information for user A remains in the cache system 624, subsequent queries for user information for user A may be more quickly retrieved from the cache system 624. However, if user information for user A's friends are stored on different database servers 602, then the cache systems 604 may not necessarily provide significant reductions to the number of fanout queries.

Since friends tend to be part of one or more groups of friends, there is strong tendency for friends to have many friends in common. When collecting user information for friends, and friends of friends, many queries for user information of common friends may occur. If these friends are randomly scattered over different database servers and cache systems, then the fanout queries will be performed.

In certain embodiments, the cache systems 604 may be configured to cluster friends within the same cache system, thus increasing cache locality. Increasing the number of friends who are local to a common cache system may increase the likelihood that requested user information for common friends will already be cached by a previous query for the user information. Increasing the cache hit rate in this manner reduces fanout queries even if the user information for common friends is stored in different database servers 602. Therefore, increasing cache locality and cache hit rate may produce significant benefits in performance, reduction in network traffic, etc., especially when dealing with extremely large numbers of nodes and queries.

Figure 7:
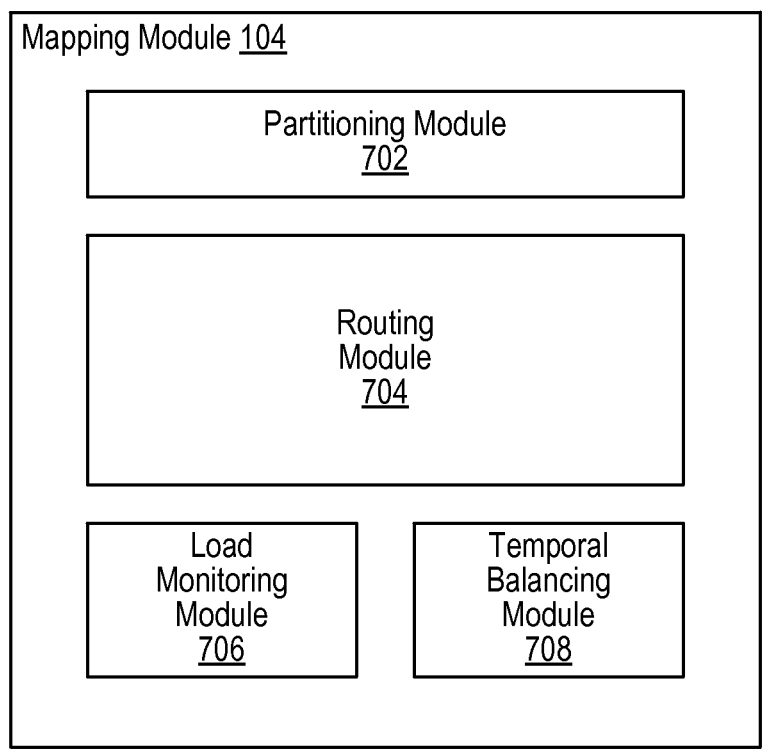
FIG. 7 illustrates an example mapping module, according to an embodiment.

FIG. 7 illustrates a mapping module, according to an embodiment. The mapping module 104 is shown including partitioning module 702, routing module 704, load monitoring module 706, and temporal balancing module 708. The partitioning module 702 may determine the number of partitions into which the graph is to be partitioned. The number of partitions may relate to the number of physical machines (e.g., database servers 602 or cache systems 604) across which the graph data is to be distributed. The unique ID space may then be divided (or segmented) based on the number of nodes for each partition.

For example, if a social graph of 1 billion users, represented by nodes, is to be partitioned over 100 cache systems, then the number of users (e.g., 1 billion) may be divided by the number of partitions (e.g., 100) to provide a partition size—i.e., the number of users per partition (e.g., 10 million users per partition). Accordingly, the unique ID space may be divided by the partition size, resulting in 10 million unique IDs per partition. Since the unique ID space is numerically sequential, the 10 million unique IDs in each partition are numerically proximate to one another. Therefore, the clustering of cities and communities within the unique ID space are reflected in the partitioning of the social graph over a multitude of machines. Furthermore, the tendency of friends to be clustered in the unique ID space is reflected in the partitioning of the graph to the machines. In this example, the partition sizes are equal (e.g., 10 million users per partition), resulting in the same number of unique IDs on each of the machines. In another embodiment, the partition sizes may not be equal, resulting in varying numbers of unique IDs on the machines.

The routing module 704 may map users to machines based on the divisions of the unique ID space and the partitions—e.g., as described for the partitioning module 702. The routing module 704 may then route users to machines according to the mapping. For example, in some instances, the number of partitions (e.g., machines) for an application will be known, and the unique ID space may be divided, as described, to map users to the cache layer of a machine. The unique ID space may be evenly or unevenly divided in different embodiments. For example, the divisions of the unique ID space may result in splitting a city or community between two machines. Furthermore, some levels of communities may be large, and thus not all communities may fit on a single machine. In an embodiment, the partition sizes (e.g., number of users per partition) may be adjusted accordingly to maintain integrity in the localities of cities or communities.

The unique ID space may be used to map users to cache systems. The unique IDs may enable clusters of friends to be routed to the same cache system, which may significantly improve locality and thus provide benefits in the processing (or executing) of queries provided to the networked computer system. The queries may be of any type, such as "friends of friends" queries submitted to a social networking system. Queries may be directed to appropriate cache systems that are needed to execute the queries. For example, a query for User A's friends would be sent to the machine that User A is mapped to based on the unique ID of User A.

In certain instances, preexisting IDs (e.g., user IDs) may already be allocated to nodes and used to map users to database servers, but in a manner that does not account for edge weights or desired clustering of closely connected nodes. In such case, unique IDs may constitute an alternative identifier. The user IDs may be mapped to the unique IDs, and the unique IDs may be used to map the users to cache systems. In this way, user data in the persistent memory layer (e.g., database servers) may be maintained, while the benefits of the unique ID space are realized in a cache layer (e.g., cache systems). In one embodiment, the mapping of user IDs to unique IDs may be stored on a machine that is accessed whenever user IDs are to be converted to unique IDs for cache layer operations.

Another benefit of the unique IDs described herein is that the number of partitions is not required to be known in order to generate the unique IDs. For example, if multiple services require different numbers of partitions, then the same unique ID space may be divided accordingly based on the corresponding number of partitions. For instance, in the example of a social graph, the networked computer system may include a persistent memory layer (or tier) of database servers and a cache layer (or tier) of cache systems. One cache layer service may be an index service implemented over 100 cache systems (e.g., 100 partitions). Another cache layer service may be a newsfeed service implemented over 200 cache systems (e.g., 200 partitions). Yet another cache layer service may be a graph service that is implemented over 300 cache systems (e.g., 300 partitions). In this way, the persistent memory layer may be kept fairly static, but the cache layer may be dynamically configured.

Routing users based on the unique IDs may significantly improve fanout issues. If users on a machine tend to access similar data, then the data will be cached after an initial query for the data and available for subsequent queries that need the same data. Take for instance a "friends of friends" query. Friends or communities may be clustered onto the same cache system. Therefore, when User A submits a query about her friends, the data for all User A's friends is fetched and stored in cache, if not already in cache. If User B is friends with User A, then it is likely that User A and User B have some number of friends in common, especially if User A and User B are living in the same city. Thus, when User B submits a query about his friends, any data for common friends of User A and User B will be already cached from the time when User A submitted her query. The greater number of friends in common, the greater the efficiency that results. Furthermore, when applied over a large number of users (e.g., 500 million users, a billion users, etc.), tremendous gains in performance and network traffic may be realized.

Furthermore, by routing a user to the same machine over different queries, the user may take advantage of data that she has already cached. For example, when a user refreshes data, such as a newsfeed or posts on a social networking system, having the query sent to the same machine in which the previous data is cached may provide a significant improvement in the speed with which the data is obtained.

While the particular examples described herein may relate to users and their friendships, the underlying concepts and principles are applicable to other nodes and connections. As discussed herein, nodes may be of any type. Furthermore, connections may include various types of relationships. For instance, a connection may be a "follow" edge, where a user follows another entity or user. The same approach of routing nodes to machines based on unique IDs may be expanded to other entities and not just persons, for example, to determine that soccer is popular in Egypt, cricket is popular in Bangladesh, and a particular business is popular in the US. For instance, one query may be "Show me all the people who like Business A and live in San Francisco". The query could be executed more efficiently if a web page of Business A associated with a social networking system was on the same machine as many of its fans. In particular, query execution may be enhanced by maintaining the web page of Business A and its fans in the cache layer of a machine.

While mapping users to machines based on divisions of the unique ID space improves locality on machines, the loads on each machine may vary, and, in some instances, significantly. In an embodiment, the routing module 704 may route users to machines based on load considerations. The load monitoring module 706 may monitor the loads of the machines while the machines are online, and work in conjunction with routing module 704 to route users to machines based on load considerations. In an embodiment, the loads may be monitored to determine if they exceed a threshold or drop below a threshold. In some instances, the amount of load (e.g., percentage of a maximum capacity) on a machine at any given time is monitored.

In an embodiment, an initial mapping is based on the divisions of the unique ID space, whether evenly distributed or not, and thereafter the routing module 704 may route users dynamically based on load balancing considerations. For example, a query by a user may be received along with the preexisting user ID for the user. A mapping of preexisting user IDs to the unique ID space may be used to convert the preexisting user ID to a unique ID. A shard number may then be determined based on a partition size, both of which may be determined by the example equations below:

Partition size=(number of users)/(number of partitions) Shard number=(unique ID)/(partition size)

For example, for 2.25 billion users and 15 thousand partitions, the partition size would be 150 thousand users per partition. Dividing any single unique ID by 150 thousand may then be used to determine a corresponding shard number. The routing module 704 may then map the shard number to the appropriate machine after taking into account load balancing considerations identified by the load monitoring module 706. After the shard number is mapped to a machine, the query may be executed on the machine.

In an embodiment, load may be determined in part by tracking the number of queries a machine has received. For example, as an application is executing queries, it may export a counter indicating the number of queries each shard is processing (e.g., application shard number 100 has 100 queries, application shard number 101 has 500 queries, etc.). The load monitoring module 706 may then receive the exported counter data and work in conjunction with the routing module 704 to, for example, determine whether or how to move users between shards of machines. For example, the load monitoring module 706 may monitor whether the number of queries that a machine is processing exceeds a threshold. If the threshold is exceeded, then the load monitoring module 706 may prevent additional queries from being routed to the machine until the number of queries being processed drops below the threshold. These additional queries may be routed to another machine until the number of queries the machine is processing drops below the threshold. Likewise, the load monitoring module 706 may monitor whether a number of queries that a machine is processing drops below a threshold. If the number of queries drops below the threshold, then the load monitoring module 706 may determine that this machine is available to receive additional queries, such as the queries prevented from being routed to machines exceeding a threshold of queries.

In one embodiment, the load monitoring module 706 determines if a machine is overloaded, and routes users accordingly. For example, a user may be initially mapped to a machine that is currently overloaded. The overloaded status is detected by the load monitoring module 706 and communicated to routing module 704, which routes the user to a different and less loaded machine. The overloaded machine is thus prevented from being further loaded, and the load of the underloaded machine is increased. In one embodiment, the load monitoring module 706 may determine a user needs more than one machine for a query, and the routing module 704 accordingly may route the query to other machines. The movement of users from one shard to another shard based on load balancing considerations, such as query processing demands, may compromise locality to some degree. The load monitoring module 706 may continuously weigh the tradeoff between locality and query speed.

In an embodiment, a geographic location may exhibit limited usage patterns. For example, for some applications, specific users associated with certain geographic locations may not be routed to one or more machines because of, for example, legal reasons, privacy reasons, etc., creating unused computing resources. For example, a country may not use or permit a particular application to be available to its residents or citizens. For instance, the European Union and Canada may not allow a specific application for its citizens, and thus users within those borders do not have access to that application. The unused shard in the cache system allotted for the application will be unused by those users. Therefore, other users associated with other geographic locations may be routed to the machine to utilize available computing resources, such as the unused shard of the cache system.

In one embodiment, the sections of the unique ID space corresponding to geographic locations associated with prohibited applications are removed from the unique ID space. A modified unique ID space (without the unique IDs corresponding to the blacked out geographic locations) may then be divided (e.g., evenly or unevenly) based on the number of partitions to map users to a shard number and corresponding machine.

In certain embodiments, users may be mapped to machines according to usage patterns that are strongly correlated with geographic locations. Different geographic locations may exhibit different usage patterns. While the unique ID space may help to optimize locality, geographic locations may have varying usage patterns, which may lead to varying loads on machines during different times. These load swings may vary significantly by providing large loading on machines at some times and providing small loading on the same machines at other times.

The temporal balancing module 708 may work in conjunction with the routing module 704 to route users to machines in a manner that accounts for usage characteristics, such as temporal fluctuations in usage patterns. For example, loads for geographic locations may vary by time of day (e.g., work hours versus non-work hours). As another example, loads also may vary by the day (e.g., holiday versus normal day) or by other larger intervals of time (e.g., summer vacation versus basketball championship). The temporal balancing module 708 may use data from the load monitoring module 706 to determine usage patterns and, based on the usage patterns, work with the routing module 704 to route users to various machines to optimize load balancing.

For instance, the temporal balancing module 708 may identify geographic locations that have complementary usage patterns. Complementary usage patterns may refer usage exhibited by geographic locations that is not in phase. For example, one type of complementary usage pattern may involve a first geographic location having a peak in traffic usage when, at a same or overlapping time, a second geographic location has a valley in traffic usage. Likewise, another type of complementary usage pattern may involve the first geographic location having a valley in traffic usage when, at a same or overlapping time, the second geographic location has a peak in traffic usage. Instead of routing the two geographic locations on two separate machines with significant swings of high traffic and low traffic, the temporal balancing module 708 may pair them together on the same machine (or cluster of machines). In this way, the machine, in effect, primarily services only one geographic location during its corresponding high traffic time, thus optimizing use of computing resources and balancing the load on the machine. In an embodiment, high traffic may be determined based on whether the traffic exceeds a predetermined threshold. Similarly, in an embodiment, low traffic may be determined based on whether traffic drops below a threshold.

Within a social networking system, a geographic location (e.g., city, country, community, etc.) or associated shard may exhibit large swings in the amount of usage of the social networking system during peak times and non-peak times. This pattern may be generally exhibited, for example, by different users in a common geographic region or time zone. For example, many cities, regions, and even countries may exhibit less traffic during the night, when people tend to be sleeping, than during the day. Thus, traffic may be categorized in 12 hour periods of time or other time intervals. As another example, a first geographic location may exhibit distinct usage (e.g., heavy traffic or minimal traffic) during an eight hour interval during the day, a second geographic location may exhibit distinct usage during a six hour interval during the day, a third geographic location may exhibit little or no distinct usage pattern.

Usage patterns may be based on habits or cultures that are associated with certain geographic regions. For instance, people in one geographic location may predominantly use the social networking system at home. Another geographic location may predominantly use the social networking system at work. Yet another geographic location may predominantly use the social networking system on weekends or other special days.

Furthermore, users of a social networking system may be unevenly distributed in different geographic locations. For instance, the United States and Europe may have very large number of users that exhibit significant usage patterns over the same or overlapping time periods. The peak periods of time for these two countries may overlap, generating tremendous combined usage during the overlapping time period. Accordingly, the combination of users from these geographic locations would cause excessive swings in load on a machine. Accordingly, in an embodiment, during the time that each geographic location exhibits peak usage, the users associated with one geographic location may be routed by the temporal balancing module 708 to a different machine during that time to avoid excessive swings in load. The users may be returned to the original machine after the peak usage interval. Routing users to avoid such excessive swings in load in this manner may be performed for any number of geographic locations over any intervals to optimize load balancing. The temporal balancing module 708 may identify intervals of times associated with heavy or light usage and accordingly group or band together specific geographic locations onto the same machine to optimize load. The temporal balancing module 708 may implement any number of permutations which may mix and match varying number of geographic locations and variously sized time intervals to optimize the load balance for different usage patterns.

The temporal balancing module 708 may band geographic locations by time zones that are complementary. For example, two geographic locations may complement one another in 12 hour periods, three geographic locations may complement each other in 8 hour periods, etc. This banding of geographic locations may be performed in various combinations for geographic locations around the world. In some instances, the temporal balancing module 708 may treat different geographic locations as a unit for purposes of load balancing.

The temporal balancing module 708 may also take into account the tradeoff between load balancing and locality. For instance, while two geographic locations may complement one another with respect to usage patterns, they may not necessarily be routed to the same machine if the impact to locality is determined to be too great.

Various systems and techniques may be implemented to account for variations in load. In an embodiment, general purpose pools of machines may be implemented to accommodate excessive load demands or a decline in load processing capability, such as due to maintenance. For example, if a machine is currently overloaded or inoperative due to maintenance, then queries mapped to the machine may be temporarily routed to a general purpose pool of machines until the machine is no longer overloaded or inoperative due to maintenance.

In an embodiment, the size of a machine pool associated with a shard may be dynamically varied in response to load demands or expected load demands. For example, the number of machines allotted to the machine pool may be increased or decreased dynamically to account for higher or lower load demands, respectively. In some instance, the size of the machine pool may vary based on expected time-of-day load changes. In some instances, the size of the machine pool may vary in response to unexpected load surges, such as load surges due to a community emergency for instance.

In some instances, certain users, communities, or chards may induce unexpectedly high loads. For example, a user may be a celebrity or public figure that receives sudden nationwide attention, drawing many queries to the user's account at the same time. The sudden and excessive increase in load demand put on the machine or shard associated with the user's account may be disruptive. The size of a machine pool associated with the user or shard may be dynamically increased to accommodate the increased load demand. In an embodiment, queries may be routed to a general purpose pool of machines to help alleviate the load demand. In some instances, the queries are routed to the general purpose pool of machines until the machine pool associated with the user or shard has been dynamically resized.

In some instances, load demands may be generated by users that are not effectively linked to a community of users or that do not have an associated unique ID, such as anonymous users, users without any friends, users not logged in, search engine scrapers, etc. Because these users are not effectively associated with a community or unique ID, the load demands they generate may not necessarily benefit from, or contribute to, some of the load and performance benefits described herein. In an embodiment, queries from such users may be routed to a general purpose pool of machines, a dedicated machine pool for these types of non-social users, or load balanced across an entire set of machines in a machine pool or in multiple machine pools.

Mappings between users to communities, unique IDs, or to shards may at times change significantly, such as due to an alteration of the clustering or to the way the node graph is partitioned. To reduce the impact of deploying a new map with significant changes to the previous map, updates may be deployed gradually or at times of reduced traffic or load, such as during global off peak hours. In an embodiment, a version identifier may be used in conjunction with the unique IDs, identifiers for communities, or identifiers of shards in order to uniquely identify which map is being utilized for a current query.

Figure 8:
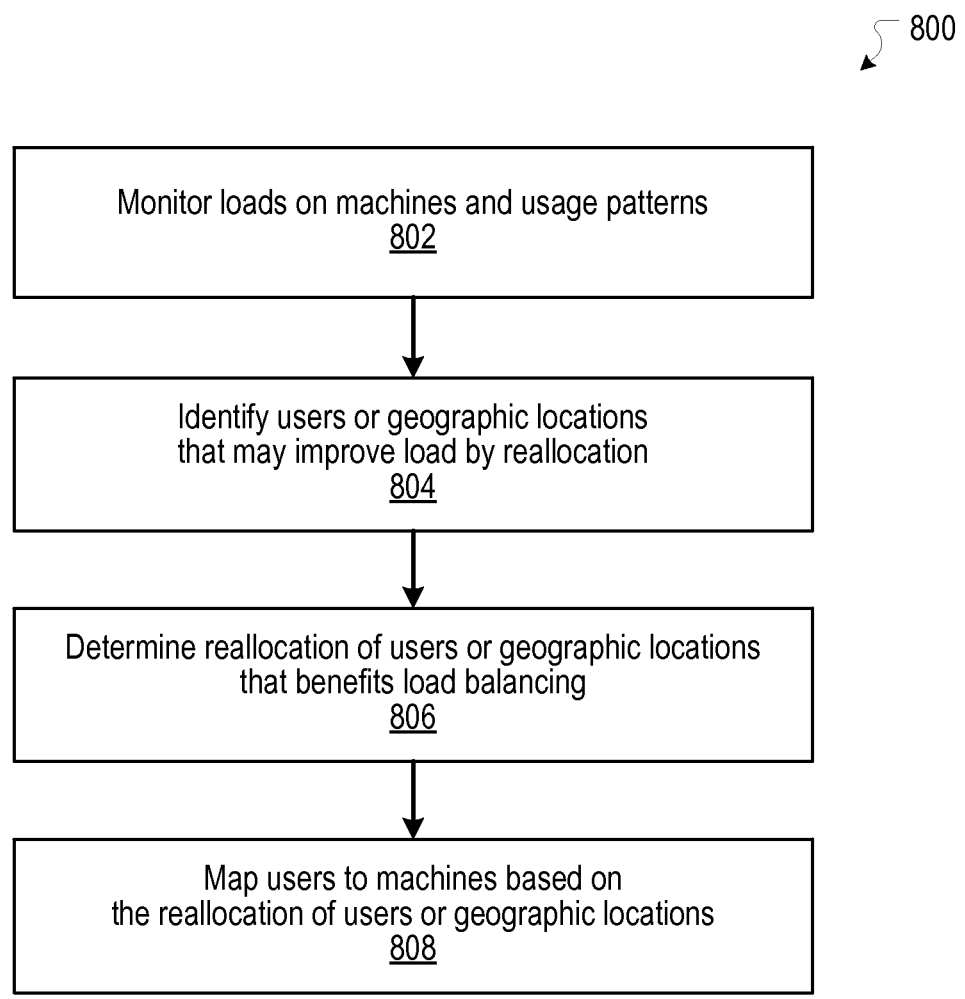
FIG. 8 illustrates an example process of mapping users to machines based on load balancing considerations, according to an embodiment.

FIG. 8 illustrates an example process of mapping users to a machines based on load balancing considerations, according to an embodiment. At block 802, loads and usage times of machines are monitored. The monitoring may be dynamic—e.g., determined as queries are received. For example, if a query is received and initially mapped to a machine (or plurality of closely associated machines, such as a machine pool), the current load on the machine may be monitored first to determine if it is overloaded. In another example, the usage patterns of geographic locations are monitored. In an embodiment, block 802 may be performed by the load monitoring module 706 of FIG. 7.

At block 804, users or geographic locations that may improve their loads by reallocation are identified. This may include identifying machines with high loads or identifying machines with low loads. These loads may, for instance, vary based on the dynamic changes in usage traffic at any given time (e.g., a machine has too many queries at once). The loads may also be identified based on any types of usage patterns. The usage patterns may be identified based on one or more time periods of usage, such as 12 hour periods, 8 hour periods, 4 hour periods, etc.

At block 806, the appropriate reallocation of users or geographic locations that is beneficial to load balancing is determined. For example, with respect to execution of a query, if the initial mapping is to a machine that is overloaded, then the query may be mapped to another machine that is underloaded. As another example, two or more groups of geographic locations may be banded together based on their complementary usage patterns in order to optimize the balancing of loads. The geographic locations may be banded together in any number of permutations which mix and match various numbers of geographic locations and various time intervals to optimize the load balance for varying usage patterns. In an embodiment, blocks 804 and 806 may be performed by the load monitoring module 706 and temporal balancing module 708 of FIG. 7.

At block 808, users are mapped to machines based on the reallocation in block 806. With respect to banded geographic locations, the users of the banded geographic locations are mapped and routed according to the optimized configuration determined in block 806. For instance, two complementary geographic locations with opposite usage patterns may be mapped and routed to the same machine.

Figure 9:
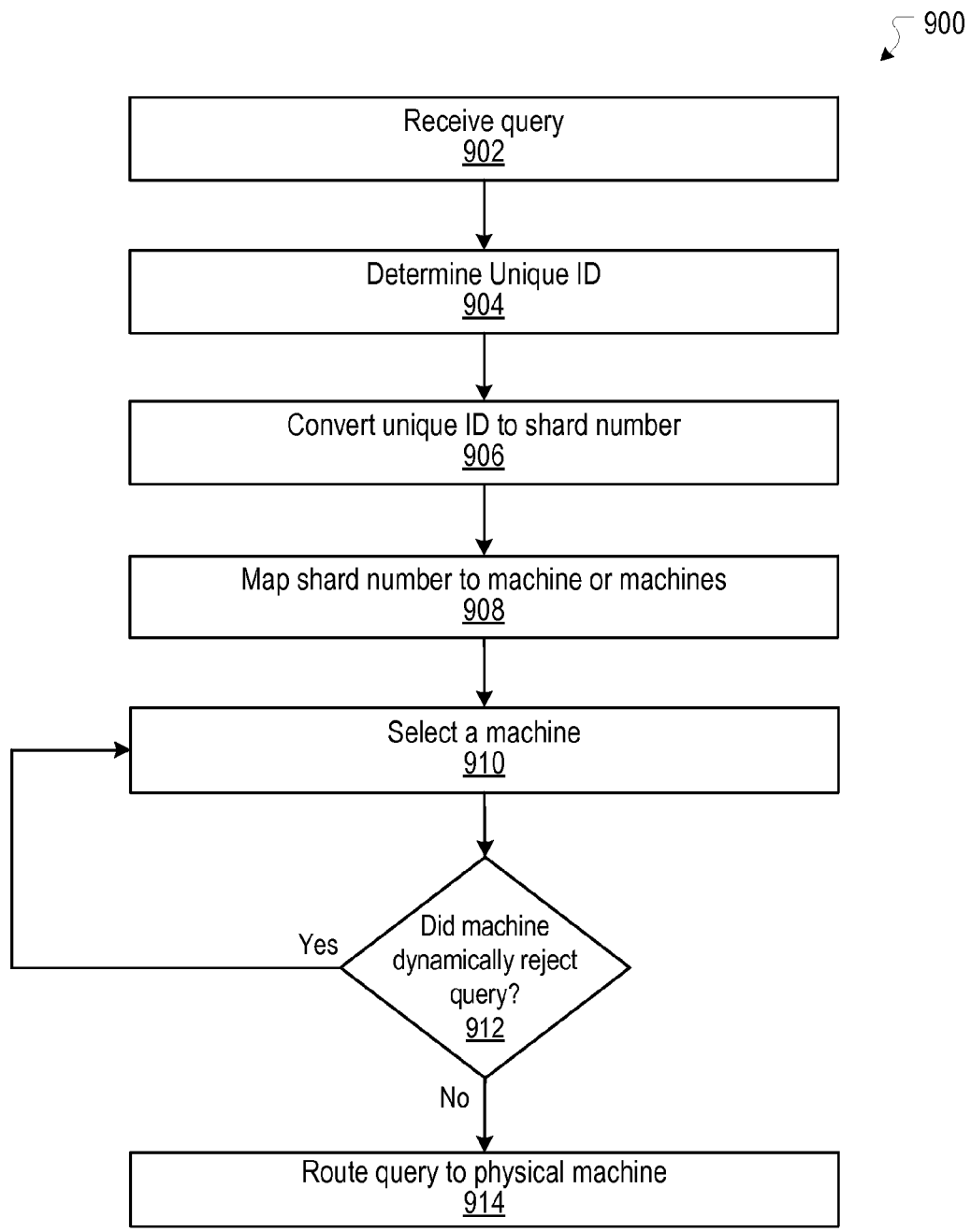
FIG. 9 illustrates an example process of routing users to machines, according to an embodiment.

FIG. 9 illustrates an example process of routing a query to a machine (or plurality of closely associated machines, such as a machine pool), according to an embodiment. It should be appreciated that the discussion above for FIGS. 6-8 may also apply to the process for FIG. 9. For the sake of brevity and clarity, similar features and functions are not repeated here for FIG. 9, but may be equally applicable.

At block 902 of process 900, a query (or request) is received. For example, the system may receive a query initiated by a user of a social networking system. The query may include a user ID for the user along with the query. At block 904, a unique ID is determined from the user ID. For example, a mapping from the user ID to the unique ID may be used to convert the user ID to a unique ID. At block 906, a shard number may be determined based on the unique ID. For example, the shard number may be determined based on a partition size, as described herein. In an embodiment, blocks 902, 904, and 906 may be performed by the shard determination module 702 of FIG. 7.

At block 908, the shard number may be mapped to a physical machine (or plurality of closely associated machines). In one embodiment, the shard number is mapped to a physical machine based on equal divisions of the unique ID space to physical machines. In an embodiment, the shard number is mapped to a physical machine based on unequal divisions of the unique ID space. In an embodiment, load balancing considerations, as discussed in more detail herein, may also be taken into consideration for the mapping of the shard number to a physical machine.

At block 910, a machine is selected. If the shard number is mapped to a plurality of machines, such as a machine pool, then one of the machines is selected. At block 912, it is determined if the selected machine dynamically rejects the query. If the query is not rejected by the selected machine, then the query is routed to the selected machine and executed by the selected machine at block 914. However, if the query is rejected by the selected machine, then another machine may be selected, as represented by the arrow from block 912 back to block 910. For example, if the first machine selected from the plurality of machine is rejected, then another machine from the plurality of machines may be selected. This selection process may continue until one of the machines from the plurality of machine accepts the query. In an embodiment, if no machine from the plurality of machines can be selected to successfully receive the query (e.g., due to overload or maintenance), then the query may be routed to a general purpose pool of machines. If the shard number was mapped to a single machine at block 908, and that machine rejects the query, then an alternate machine may be selected to receive the query, such as a machine from a general purpose pool of machines. In another embodiment, if a query is rejected by a selected machine, the query may be resent to the same machine after a predetermined waiting period. In an embodiment, blocks 908, 910, 912, and 914 may be performed by the routing module 704, the load monitoring module 706, and the temporal balancing module 708 of FIG. 7.

Social Networking System—Example Implementation

Figure 10:
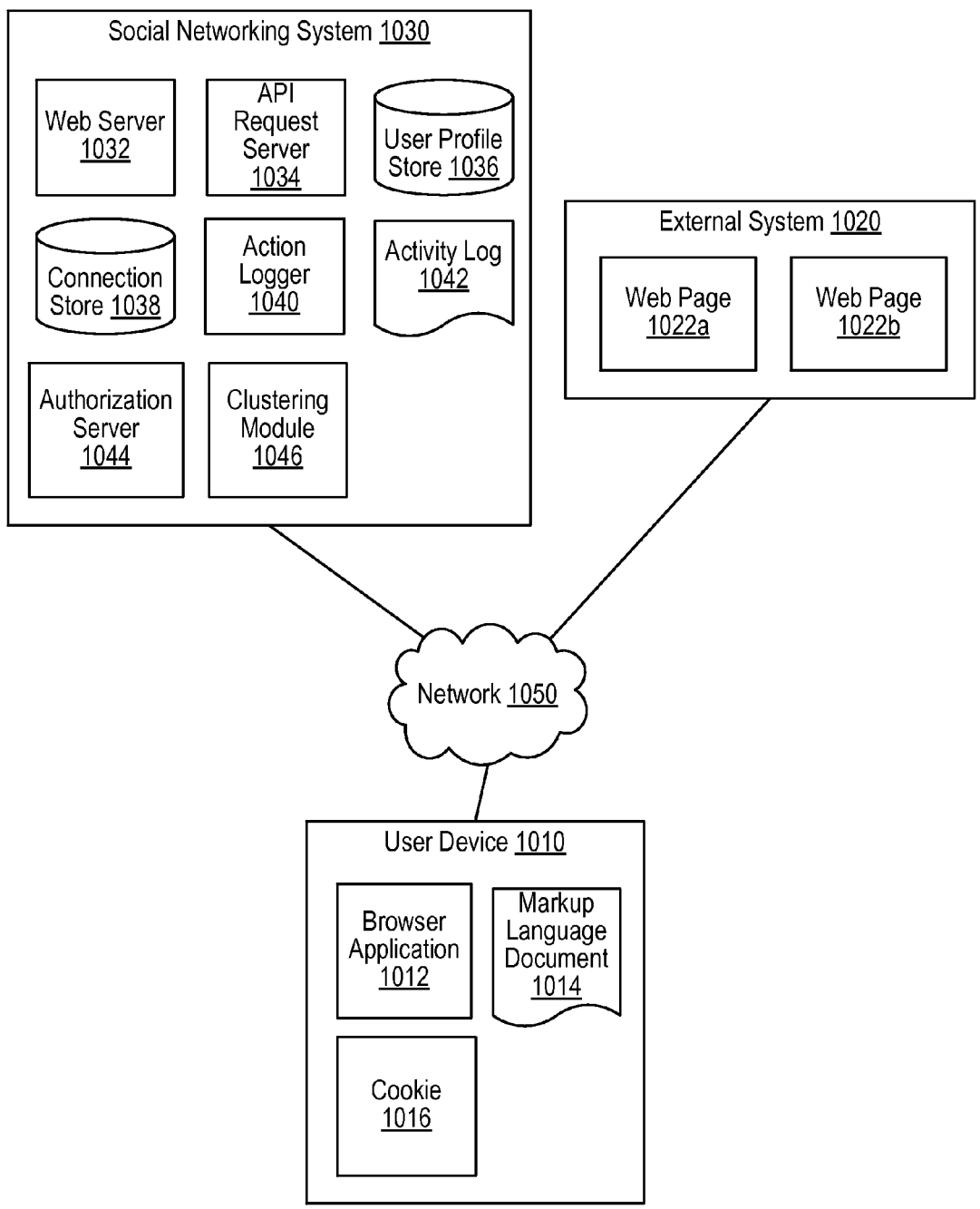
FIG. 10 illustrates an example network diagram of a system for clustering and mapping users within a social networking system, according to an embodiment.

FIG. 10 is a network diagram of an example system 1000 for substituting video links within a social network in accordance with an embodiment of the invention. The system 1000 includes one or more user devices 1010, one or more external systems 1020, a social networking system 1030, and a network 1050. In an embodiment, the social networking system discussed in connection with the embodiments described above may be implemented as the social networking system 1030. For purposes of illustration, the embodiment of the system 1000, shown by FIG. 10, includes a single external system 1020 and a single user device 1010. However, in other embodiments, the system 1000 may include more user devices 1010 and/or more external systems 1020. In certain embodiments, the social networking system 1030 is operated by a social network provider, whereas the external systems 1020 are separate from the social networking system 1030 in that they may be operated by different entities. In various embodiments, however, the social networking system 1030 and the external systems 1020 operate in conjunction to provide social networking services to users (or members) of the social networking system 1030. In this sense, the social networking system 1030 provides a platform or backbone, which other systems, such as external systems 1020, may use to provide social networking services and functionalities to users across the Internet.

The user device 1010 comprises one or more computing devices that can receive input from a user and transmit and receive data via the network 1050. In one embodiment, the user device 1010 is a conventional computer system executing, for example, a Microsoft Windows compatible operating system (OS), Apple OS X, and/or a Linux distribution. In another embodiment, the user device 1010 can be a device having computer functionality, such as a smart-phone, a tablet, a personal digital assistant (PDA), a mobile telephone, etc. The user device 1010 is configured to communicate via the network 1050. The user device 1010 can execute an application, for example, a browser application that allows a user of the user device 1010 to interact with the social networking system 1030. In another embodiment, the user device 1010 interacts with the social networking system 1030 through an application programming interface (API) provided by the native operating system of the user device 1010, such as iOS and ANDROID. The user device 1010 is configured to communicate with the external system 1020 and the social networking system 1030 via the network 1050, which may comprise any combination of local area and/or wide area networks, using wired and/or wireless communication systems.

In one embodiment, the network 1050 uses standard communications technologies and protocols. Thus, the network 1050 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 1050 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 1050 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 1010 may display content from the external system 1020 and/or from the social networking system 1030 by processing a markup language document 1014 received from the external system 1020 and from the social networking system 1030 using a browser application 1012. The markup language document 1014 identifies content and one or more instructions describing formatting or presentation of the content. By executing the instructions included in the markup language document 1014, the browser application 1012 displays the identified content using the format or presentation described by the markup language document 1014. For example, the markup language document 1014 includes instructions for generating and displaying a web page having multiple frames that include text and/or image data retrieved from the external system 1020 and the social networking system 1030. In various embodiments, the markup language document 1014 comprises a data file including extensible markup language (XML) data, extensible hypertext markup language (XHTML) data, or other markup language data. Additionally, the markup language document 1014 may include JavaScript Object Notation (JSON) data, JSON with padding (JSONP), and JavaScript data to facilitate data-interchange between the external system 1020 and the user device 1010. The browser application 1012 on the user device 1010 may use a JavaScript compiler to decode the markup language document 1014.

The markup language document 1014 may also include, or link to, applications or application frameworks such as FLASH™ or Unity™ applications, the SilverLight™ application framework, etc.

In one embodiment, the user device 1010 also includes one or more cookies 1016 including data indicating whether a user of the user device 1010 is logged into the social networking system 1030, which may enable modification of the data communicated from the social networking system 1030 to the user device 1010.

The external system 1020 includes one or more web servers that include one or more web pages 1022a, 1022b, which are communicated to the user device 1010 using the network 1050. The external system 1020 is separate from the social networking system 1030. For example, the external system 1020 is associated with a first domain, while the social networking system 1030 is associated with a separate social networking domain. Web pages 1022a, 1022b, included in the external system 1020, comprise markup language documents 1014 identifying content and including instructions specifying formatting or presentation of the identified content.

The social networking system 1030 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 1030 may be administered, managed, or controlled by an operator. The operator of the social networking system 1030 may be a human being, an automated application, or a series of applications for managing content, regulating policies, and collecting usage metrics within the social networking system 1030. Any type of operator may be used.

Users may join the social networking system 1030 and then add connections to any number of other users of the social networking system 1030 to whom they desire to be connected. As used herein, the term "friend" refers to any other user of the social networking system 1030 to whom a user has formed a connection, association, or relationship via the social networking system 1030. For example, in an embodiment, if users in the social networking system 1030 are represented as nodes in the social graph, the term "friend" can refer to an edge formed between and directly connecting two user nodes.

Connections may be added explicitly by a user or may be automatically created by the social networking system 1030 based on common characteristics of the users (e.g., users who are alumni of the same educational institution). For example, a first user specifically selects a particular other user to be a friend. Connections in the social networking system 1030 are usually in both directions, but need not be, so the terms "user" and "friend" depend on the frame of reference. Connections between users of the social networking system 1030 are usually bilateral ("two-way"), or "mutual," but connections may also be unilateral, or "one-way." For example, if Bob and Joe are both users of the social networking system 1030 and connected to each other, Bob and Joe are each other's connections. If, on the other hand, Bob wishes to connect to Joe to view data communicated to the social networking system 1030 by Joe, but Joe does not wish to form a mutual connection, a unilateral connection may be established. The connection between users may be a direct connection; however, some embodiments of the social networking system 1030 allow the connection to be indirect via one or more levels of connections or degrees of separation.

In addition to establishing and maintaining connections between users and allowing interactions between users, the social networking system 1030 provides users with the ability to take actions on various types of items supported by the social networking system 1030. These items may include groups or networks (i.e., social networks of people, entities, and concepts) to which users of the social networking system 1030 may belong, events or calendar entries in which a user might be interested, computer-based applications that a user may use via the social networking system 1030, transactions that allow users to buy or sell items via services provided by or through the social networking system 1030, and interactions with advertisements that a user may perform on or off the social networking system 1030. These are just a few examples of the items upon which a user may act on the social networking system 1030, and many others are possible. A user may interact with anything that is capable of being represented in the social networking system 1030 or in the external system 1020, separate from the social networking system 1030, or coupled to the social networking system 1030 via the network 1050.

The social networking system 1030 is also capable of linking a variety of entities. For example, the social networking system 1030 enables users to interact with each other as well as external systems 1020 or other entities through an API, a web service, or other communication channels. The social networking system 1030 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 1030. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 1030 modifies edges connecting the various nodes to reflect the relationships and interactions.

The social networking system 1030 also includes user-generated content, which enhances a user's interactions with the social networking system 1030. User-generated content may include anything a user can add, upload, send, or "post" to the social networking system 1030. For example, a user communicates posts to the social networking system 1030 from a user device 1010. Posts may include data such as status updates or other textual data, location information, images such as photos, videos, links, music or other similar data and/or media. Content may also be added to the social networking system 1030 by a third party. Content "items" are represented as objects in the social networking system 1030. In this way, users of the social networking system 1030 are encouraged to communicate with each other by posting text and content items of various types of media through various communication channels. Such communication increases the interaction of users with each other and increases the frequency with which users interact with the social networking system 1030.

The social networking system 1030 includes a web server 1032, an API request server 1034, a user profile store 1036, a connection store 1038, an action logger 1040, an activity log 1042, an authorization server 1044, and a video substitution module 1046. In an embodiment of the invention, the social networking system 1030 may include additional, fewer, or different components for various applications. Other components, such as network interfaces, security mechanisms, load balancers, failover servers, management and network operations consoles, and the like are not shown so as to not obscure the details of the system.

The user profile store 1036 maintains information about user accounts, including biographic, demographic, and other types of descriptive information, such as work experience, educational history, hobbies or preferences, location, and the like that has been declared by users or inferred by the social networking system 1030. This information is stored in the user profile store 1036 such that each user is uniquely identified. The social networking system 1030 also stores data describing one or more connections between different users in the connection store 1038. The connection information may indicate users who have similar or common work experience, group memberships, hobbies, or educational history. Additionally, the social networking system 1030 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 1030, such as non-person entities, buckets, cluster centers, images, interests, pages, external systems, concepts, and the like are also stored in the connection store 1038.

The social networking system 1030 maintains data about objects with which a user may interact. To maintain this data, the user profile store 1036 and the connection store 1038 store instances of the corresponding type of objects maintained by the social networking system 1030. Each object type has information fields that are suitable for storing information appropriate to the type of object. For example, the user profile store 1036 contains data structures with fields suitable for describing a user's account and information related to a user's account. When a new object of a particular type is created, the social networking system 1030 initializes a new data structure of the corresponding type, assigns a unique object identifier to it, and begins to add data to the object as needed. This might occur, for example, when a user becomes a user of the social networking system 1030, the social networking system 1030 generates a new instance of a user profile in the user profile store 1036, assigns a unique identifier to the user account, and begins to populate the fields of the user account with information provided by the user.

The connection store 1038 includes data structures suitable for describing a user's connections to other users, connections to external systems 1020 or connections to other entities. The connection store 1038 may also associate a connection type with a user's connections, which may be used in conjunction with the user's privacy setting to regulate access to information about the user. In an embodiment of the invention, the user profile store 1036 and the connection store 1038 may be implemented as a federated database.

Data stored in the connection store 1038, the user profile store 1036, and the activity log 1042 enables the social networking system 1030 to generate the social graph that uses nodes to identify various objects and edges connecting nodes to identify relationships between different objects. For example, if a first user establishes a connection with a second user in the social networking system 1030, user accounts of the first user and the second user from the user profile store 1036 may act as nodes in the social graph. The connection between the first user and the second user stored by the connection store 1038 is an edge between the nodes associated with the first user and the second user. Continuing this example, the second user may then send the first user a message within the social networking system 1030. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 1030 (or, alternatively, in an image maintained by another system outside of the social networking system 1030). The image may itself be represented as a node in the social networking system 1030. This tagging action may create edges between the first user and the second user as well as create an edge between each of the users and the image, which is also a node in the social graph. In yet another example, if a user confirms attending an event, the user and the event are nodes obtained from the user profile store 1036, where the attendance of the event is an edge between the nodes that may be retrieved from the activity log 1042. By generating and maintaining the social graph, the social networking system 1030 includes data describing many different types of objects and the interactions and connections among those objects, providing a rich source of socially relevant information.

The web server 1032 links the social networking system 1030 to one or more user devices 1010 and/or one or more external systems 1020 via the network 1050. The web server 1032 serves web pages, as well as other web-related content, such as Java, JavaScript, Flash, XML, and so forth. The web server 1032 may include a mail server or other messaging functionality for receiving and routing messages between the social networking system 1030 and one or more user devices 1010. The messages can be instant messages, queued messages (e.g., email), text and SMS messages, or any other suitable messaging format.

The API request server 1034 allows one or more external systems 1020 and user devices 1010 to call access information from the social networking system 1030 by calling one or more API functions. The API request server 1034 may also allow external systems 1020 to send information to the social networking system 1030 by calling APIs. The external system 1020, in one embodiment, sends an API request to the social networking system 1030 via the network 1050, and the API request server 1034 receives the API request. The API request server 1034 processes the request by calling an API associated with the API request to generate an appropriate response, which the API request server 1034 communicates to the external system 1020 via the network 1050. For example, responsive to an API request, the API request server 1034 collects data associated with a user, such as the user's connections that have logged into the external system 1020, and communicates the collected data to the external system 1020. In another embodiment, the user device 1010 communicates with the social networking system 1030 via APIs in the same manner as external systems 1020.

The action logger 1040 is capable of receiving communications from the web server 1032 about user actions on and/or off the social networking system 1030. The action logger 1040 populates the activity log 1042 with information about user actions, enabling the social networking system 1030 to discover various actions taken by its users within the social networking system 1030 and outside of the social networking system 1030. Any action that a particular user takes with respect to another node on the social networking system 1030 may be associated with each user's account, through information maintained in the activity log 1042 or in a similar database or other data repository. Examples of actions taken by a user within the social networking system 1030 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 1030, the action is recorded in the activity log 1042. In one embodiment, the social networking system 1030 maintains the activity log 1042 as a database of entries. When an action is taken within the social networking system 1030, an entry for the action is added to the activity log 1042. The activity log 1042 may be referred to as an action log.

Additionally, user actions may be associated with concepts and actions that occur within an entity outside of the social networking system 1030, such as an external system 1020 that is separate from the social networking system 1030. For example, the action logger 1040 may receive data describing a user's interaction with an external system 1020 from the web server 1032. In this example, the external system 1020 reports a user's interaction according to structured actions and objects in the social graph.

Other examples of actions where a user interacts with an external system 1020 include a user expressing an interest in an external system 1020 or another entity, a user posting a comment to the social networking system 1030 that discusses an external system 1020 or a web page 1022*a* within the external system 1020, a user posting to the social networking system 1030 a Uniform Resource Locator (URL) or other identifier associated with an external system 1020, a user attending an event associated with an external system 1020, or any other action by a user that is related to an external system 1020. Thus, the activity log 1042 may include actions describing interactions between a user of the social networking system 1030 and an external system 1020 that is separate from the social networking system 1030.

The authorization server 1044 enforces one or more privacy settings of the users of the social networking system 1030. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 1020, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 1020. One embodiment allows the specification of the set of entities to comprise an enumeration of entities. For example, the user may provide a list of external systems 1020 that are allowed to access certain information. Another embodiment allows the specification to comprise a set of entities along with exceptions that are not allowed to access the information. For example, a user may allow all external systems 1020 to access the user's work information, but specify a list of external systems 1020 that are not allowed to access the work information. Certain embodiments call the list of exceptions that are not allowed to access certain information a "block list". External systems 1020 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 1044 contains logic to determine if certain information associated with a user can be accessed by a user's friends, external systems 1020, and/or other applications and entities. The external system 1020 may need authorization from the authorization server 1044 to access the user's more private and sensitive information, such as the user's work phone number. Based on the user's privacy settings, the authorization server 1044 determines if another user, the external system 1020, an application, or another entity is allowed to access information associated with the user, including information about actions taken by the user.

The social networking system 1030 may include clustering module 1046. The clustering module 1046 may generate unique IDs and assign them to nodes of a social graph. Furthermore, the clustering module 1046 may utilize the unique IDs to partition the social graph over the social networking system 1030. The unique ID space may be used to map users to machines (e.g., database servers or caching systems) of the social networking system 1030. The clustering module 1046 may route users of the social networking system 1030 to the machines based on the mapping. The clustering module 1046 may map or route users to machines based on load balancing considerations, such as traffic usage patterns, or whether machines are overloaded or underloaded. In an embodiment, the clustering module 1046 may be implemented as the clustering module 1046 of FIG. 1.

Hardware Implementation

Figure 11:
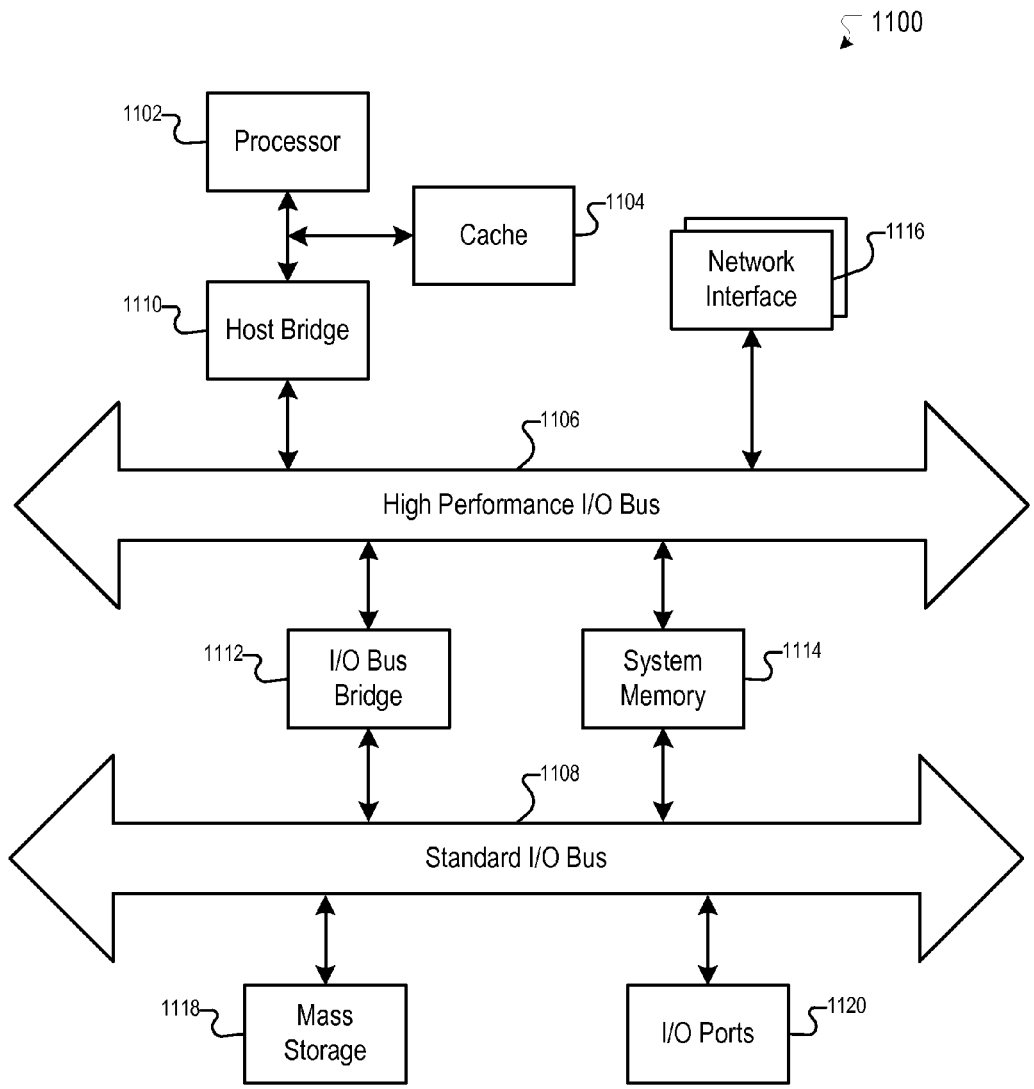
FIG. 11 illustrates an example computer system that may be used to implement one or more of the embodiments described herein, according to an embodiment.

The foregoing processes and features can be implemented by a wide variety of machine and computer system architectures and in a wide variety of network and computing environments. FIG. 11 illustrates an example of a computer system 1100 that may be used to implement one or more of the embodiments described herein in accordance with an embodiment of the invention. The computer system 1100 includes sets of instructions for causing the computer system 1100 to perform the processes and features discussed herein. The computer system 1100 may be connected (e.g., networked) to other machines. In a networked deployment, the computer system 1100 may operate in the capacity of a server machine or a client machine in a client-server network environment, or as a peer machine in a peer-to-peer (or distributed) network environment. In an embodiment of the invention, the computer system 1100 may be a component of the social networking system described herein. In an embodiment of the invention, the computer system 1100 may be one server among many that constitutes all or part of the social networking system 730.

The computer system 1100 includes a processor 1102, a cache 1104, and one or more executable modules and drivers, stored on a computer-readable medium, directed to the processes and features described herein. Additionally, the computer system 1100 includes a high performance input/output (I/O) bus 1106 and a standard I/O bus 1108. A host bridge 1110 couples processor 1102 to high performance I/O bus 1106, whereas I/O bus bridge 1112 couples the two buses 1106 and 1108 to each other. A system memory 1114 and one or more network interfaces 1116 couple to high performance I/O bus 1106. The computer system 1100 may further include video memory and a display device coupled to the video memory (not shown). Mass storage 1118 and I/O ports 1120 couple to the standard I/O bus 1108. The computer system 1100 may optionally include a keyboard and pointing device, a display device, or other input/output devices (not shown) coupled to the standard I/O bus 1108. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1100, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1100 are described in greater detail below. In particular, the network interface 1116 provides communication between the computer system 1100 and any of a wide range of networks, such as an Ethernet (e.g., IEEE 802.3) network, a backplane, etc. The mass storage 1118 provides permanent storage for the data and programming instructions to perform the above-described processes and features implemented by the respective computing systems identified above, whereas the system memory 1114 (e.g., DRAM) provides temporary storage for the data and programming instructions when executed by the processor 1102. The I/O ports 1120 may be one or more serial and/or parallel communication ports that provide communication between additional peripheral devices, which may be coupled to the computer system 1100.

The computer system 1100 may include a variety of system architectures, and various components of the computer system 1100 may be rearranged. For example, the cache 1104 may be on-chip with processor 1102. Alternatively, the cache 1104 and the processor 1102 may be packed together as a "processor module", with processor 1102 being referred to as the "processor core". Furthermore, certain embodiments of the invention may neither require nor include all of the above components. For example, peripheral devices coupled to the standard I/O bus 1108 may couple to the high performance I/O bus 1106. In addition, in some embodiments, only a single bus may exist, with the components of the computer system 1100 being coupled to the single bus. Furthermore, the computer system 1100 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1100 that, when read and executed by one or more processors, cause the computer system 1100 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1100, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1102. Initially, the series of instructions may be stored on a storage device, such as the mass storage 1118. However, the series of instructions can be stored on any suitable computer readable storage medium. Furthermore, the series of instructions need not be stored locally, and could be received from a remote storage device, such as a server on a network, via the network interface 1116. The instructions are copied from the storage device, such as the mass storage 1118, into the system memory 1114 and then accessed and executed by the processor 1102. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1100 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A computer implemented method comprising:
    determining, by a computer system, classifications associated with a plurality of nodes, wherein the plurality of nodes are associated with users of a social networking system, the social networking system being implemented using one or more computing devices, wherein connections between the nodes are formed based at least in part on user interactions in the social networking system, and wherein a classification associated with a node corresponds to at least one geographic location of a user associated with the node;
    grouping, by the computer system, the classifications into first level communities based on edge weights between the classifications, wherein an edge weight between a first classification and a second classification is determined based on a respective amount of time since a first user associated with the first classification and a second user associated with the second classification interacted with one another as measured by the social networking system;
    grouping, by the computer system, the first level communities into second level communities based on edge weights between the first level communities;
    generating, by the computer system, a sorted list of the plurality of nodes based on the classifications, the first level communities, and the second level communities;
    assigning, by the computer system, unique identifiers (IDs) sequentially to the sorted list of the plurality of nodes, wherein users that are located in the same geographic location are assigned IDs from a first set of unique IDs while users not in the same geographic location are assigned unique IDs from a second set of unique IDs; and
    routing, by the computer system, requests received from computing devices of users associated with the plurality of nodes to at least one server, wherein one or more requests from a portion of the users from a first geographic location are routed to at least one different server than a portion of the users from a second geographic location based on an overlapping threshold peak period of time between the first geographic location and the second geographic location.

2. The method of claim 1, wherein the plurality of nodes is associated with at least one of persons, non-persons, organizations, content, events, web pages, communications, objects, or concepts.

3. The method of claim 1, wherein the classifications represent at least one attribute associated with the plurality of nodes.

4. The method of claim 3, wherein the at least one attribute includes geographic locations.

5. The method of claim 1, wherein connections between nodes of the plurality of nodes are associated with the edge weights.

6. The method of claim 5, wherein the edge weights are based on numbers of the connections.

7. The method of claim 5, wherein the connections represent shared characteristics between nodes of the plurality of nodes.

8. The method of claim 7, wherein the edge weights account for the shared characteristics.

9. The method of claim 8, wherein a first shared characteristic is weighted differently from a second shared characteristic.

10. The method of claim 1, wherein the generating the sorted list of the plurality of nodes comprises sorting the plurality of nodes by the second level communities.

11. The method of claim 1, wherein the generating the sorted list of the plurality of nodes comprises sorting the plurality of nodes by the first level communities.

12. The method of claim 1, wherein the generating the sorted list of the plurality of nodes comprises sorting the plurality of nodes by the classifications.

13. The method of claim 1, further comprising:
    iteratively grouping communities at lower levels to communities at higher levels based on edge weights between the communities at each of the lower levels; and
    generating a sorted list of the plurality of nodes further based on the communities at higher levels.

14. The method of claim 1, further comprising mapping preexisting IDs associated with the plurality of nodes to the unique IDs.

15. The method of claim 1, wherein the grouping the classifications into first level communities comprises:
    maximizing at least one of a number of connections or a strength of connections within a community; and
    minimizing at least one of a number of connections or a strength of connections between communities.

16. A system comprising:
    at least one processor, and
    a memory storing instructions configured to instruct the at least one processor to perform:
        determining, by a computer system, classifications associated with a plurality of nodes, wherein the plurality of nodes are associated with users of a social networking system, the social networking system being implemented using one or more computing devices, wherein connections between the nodes are formed based at least in part on user interactions in the social networking system, and wherein a classification associated with a node corresponds to at least one geographic location of a user associated with the node;

grouping the classifications into first level communities based on edge weights between the classifications, wherein an edge weight between a first classification and a second classification is determined based on a respective amount of time since a first user associated with the first classification and a second user associated with the second classification interacted with one another as measured by the social networking system;

grouping the first level communities into second level communities based on edge weights between the first level communities;

generating a sorted list of the plurality of nodes based on the classifications, the first level communities, and the second level communities;

assigning, by the computer system, unique identifiers (IDs) sequentially to the sorted list of the plurality of nodes, wherein users that are located in the same geographic location are assigned IDs from a first set of unique IDs while users not in the same geographic location are assigned unique IDs from a second set of unique IDs; and routing, by the computer system, requests received from computing devices of users associated with the plurality of nodes to at least one server, wherein one or more requests from a portion of the users from a first geographic location are routed to at least one different server than a portion of the users from a second geographic location based on an overlapping threshold peak period of time between the first geographic location and the second geographic location.

17. A non-transitory computer-readable storage medium storing computer-executable instructions that, when executed, cause a computer system to perform computer-implemented method comprising:

determining, by a computer system, classifications associated with a plurality of nodes, wherein the plurality of nodes are associated with users of a social networking system, the social networking system being implemented using one or more computing devices, wherein connections between the nodes are formed based at least in part on user interactions in the social networking system, and wherein a classification associated with a node corresponds to at least one geographic location of a user associated with the node;

grouping the classifications into first level communities based on edge weights between the classifications, wherein an edge weight between a first classification and a second classification is determined based on a respective amount of time since a first user associated with the first classification and a second user associated with the second classification interacted with one another as measured by the social networking system;

grouping the first level communities into second level communities based on edge weights between the first level communities;

generating a sorted list of the plurality of nodes based on the classifications, the first level communities, and the second level communities;

assigning, by the computer system, unique identifiers (IDs) sequentially to the sorted list of the plurality of nodes, wherein users that are located in the same geographic location are assigned IDs from a first set of unique IDs while users not in the same geographic location are assigned unique IDs from a second set of unique IDs; and routing, by the computer system, requests received from computing devices of users associated with the plurality of nodes to at least one server, wherein one or more requests from a portion of the users from a first geographic location are routed to at least one different server than a portion of the users from a second geographic location based on an overlapping threshold peak period of time between the first geographic location and the second geographic location.

* * * * *